United States Patent
Wu et al.

(10) Patent No.: US 11,481,485 B2
(45) Date of Patent: Oct. 25, 2022

(54) METHODS AND SYSTEMS FOR PEER GROUPING IN INSIDER THREAT DETECTION

(71) Applicant: Visa International Service Association, San Francisco, CA (US)

(72) Inventors: Yuhang Wu, Santa Clara, CA (US); Yanhong Wu, Mountain View, CA (US); Hossein Hamooni, San Carlos, CA (US); Yu-San Lin, Mountain View, CA (US); Hao Yang, San Jose, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 429 days.

(21) Appl. No.: 16/737,367

(22) Filed: Jan. 8, 2020

(65) Prior Publication Data

US 2021/0209229 A1    Jul. 8, 2021

(51) Int. Cl.
| | |
|---|---|
| *G06F 21/00* | (2013.01) |
| *G06F 21/55* | (2013.01) |
| *G06Q 50/26* | (2012.01) |
| *G06F 16/28* | (2019.01) |
| *G06Q 10/10* | (2012.01) |

(52) U.S. Cl.
CPC .......... *G06F 21/552* (2013.01); *G06F 16/285* (2019.01); *G06Q 10/105* (2013.01); *G06Q 50/265* (2013.01); *G06F 2221/034* (2013.01)

(58) Field of Classification Search
CPC ............. G06F 21/554; G06F 2221/034; G06F 21/552; G06F 16/285; G06Q 50/265; G06Q 10/105; H04W 12/122; H04L 63/1425; H04L 63/1441; H04L 63/1433; H04L 63/1416; H04L 63/102; H04L 67/22; H04L 63/1408; H04L 63/145
See application file for complete search history.

(56) References Cited

U.S. PATENT DOCUMENTS

| | | | |
|---|---|---|---|
| 10,019,442 B2 | 7/2018 | Nefedov | |
| 2012/0137367 A1* | 5/2012 | Dupont | G06F 21/00 726/25 |
| 2015/0235152 A1 | 8/2015 | Eldardiry | |
| 2015/0286783 A1* | 10/2015 | Kumar | G16H 40/20 705/2 |

* cited by examiner

*Primary Examiner* — Tri M Tran
(74) *Attorney, Agent, or Firm* — Schwabe, Williamson & Wyatt, PC

(57) ABSTRACT

Methods for detecting insider threats are disclosed. A method includes collecting server access data and application access data, based on the server access data and the application access data, determining nearest neighbors of an employee, and based on the nearest neighbors of the employee, determining a peer group of the employee, determining an average rank distance (ARD) of the nearest neighbors based on a ranking of the nearest neighbors in a plurality of time periods, identifying ARD gaps between the nearest neighbors, and generating scores corresponding to the ARD gaps between the nearest neighbors. One or more employees are identified that represent an internal threat to an organization based on the scores corresponding to the ARD gaps.

20 Claims, 26 Drawing Sheets

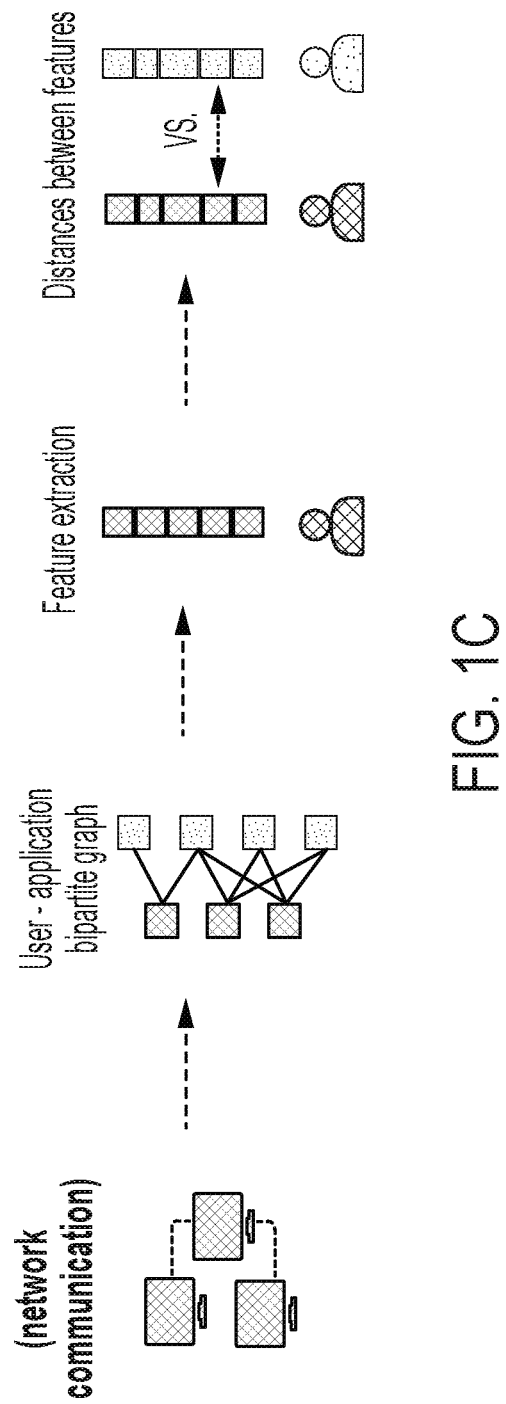

Rank of A, B and C based on O

|  | Rank 1 | Rank 2 | Rank 3 |
|---|---|---|---|
| November, 2018 | B | A | C |
| December, 2018 | A | B | C |
| January, 2018 | C | A | B |

Average rank distance (ARD) between A and O is: (2+1+2)/3 = 1.67
Average rank distance (ARD) between B and O is: (1+2+3)/3 = 2
Average rank distance (ARD) between C and O is: (3+3+1)/3 = 3.33

FIG. 2N

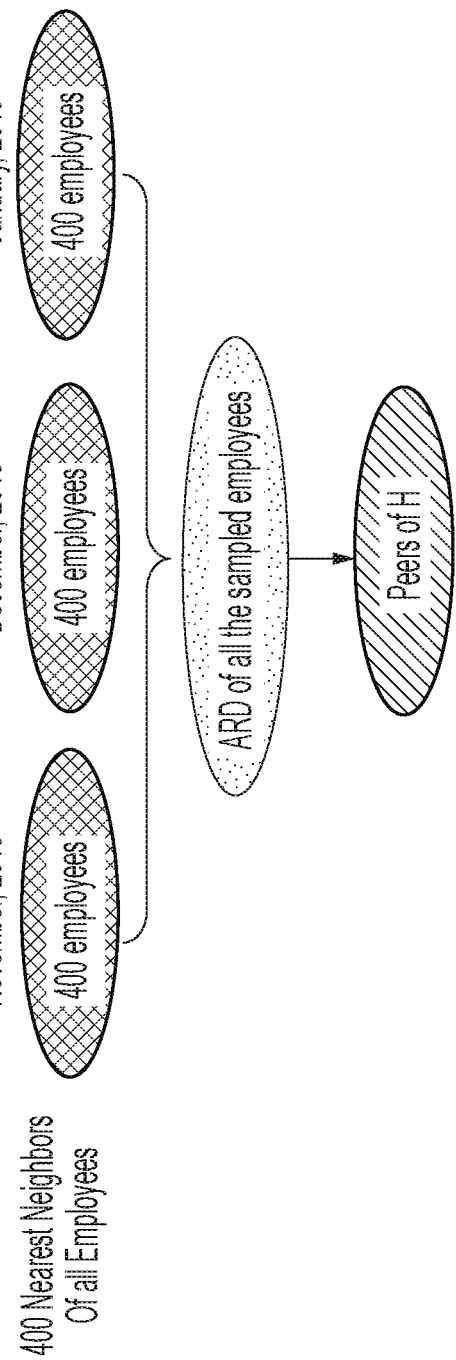

METHODS AND SYSTEMS FOR PEER GROUPING IN INSIDER THREAT DETECTION

TECHNICAL FIELD

Embodiments of the disclosure pertain to insider threat detection and, in particular, methods and systems for peer grouping in insider threat detection.

TECHNOLOGY BACKGROUND

Enterprise data security is the process of delivering, monitoring and managing security across all data objects and repositories within an organization. Moreover, enterprise data security includes the number of tools, techniques, policies and framework that are enlisted to ensure that data is secure, regardless of where it is stored or consumed within the organization. Enterprise data security is also known as enterprise data protection.

Enterprise data security can be compromised by insider attacks. Insider attacks are attacks that come from within an organization. Such attacks account for billions of dollars in damages yearly for American businesses. Although insider attacks are rarer than other threats to an organization, they can be harder to detect and more costly than attacks coming from outside hackers.

A recent high profile insider attack, resulted in the exposure of customer social security numbers, driver's license numbers and birth dates. This breach of security resulted in large fines for the enterprise. Breaches such as these can damage a company's reputation. Although, any data breach can threaten a company's reputation, those coming from inside can be especially damaging.

BRIEF DESCRIPTION OF THE DRAWINGS

FIG. 1C shows a flow of an example process for determining distance between features of employees.

FIG. 2N illustrates the manner in which an average rank distance (ARD) between employee O and employees A, B and C described with reference to FIG. 2E are determined.

FIG. 2O illustrates the manner in which the peers of employee H can be determined from employee H's 400 nearest neighbors based on the determined ARD.

DESCRIPTION OF THE EMBODIMENTS

The embodiments described herein are not intended to be limited to the specific forms set forth herein. The embodiments are intended to cover such alternatives, modifications, and equivalents that are within the scope of the appended claims.

The detailed description that follows includes numerous specific details such as specific method orders, configurations, structures, elements, and connections have been set forth. It is to be understood however that these and other specific details need not be utilized to practice embodiments. In other embodiments, well-known structures, elements, or connections have been omitted, or have not been described in a manner so as not to obscure this description.

Any reference within the specification to "one embodiment" or "an embodiment" is intended to indicate that a particular feature, configuration, structure, or characteristic described in connection with the embodiment is included in at least one embodiment of the present invention. The appearance of the phrase "in one embodiment" in different parts of the specification can refer to different embodiments. Embodiments described as separate or alternative embodiments are not mutually exclusive of other embodiments. Moreover, various features are described which may be included in some embodiments and not by others. In additions, some requirements for some embodiments may not be required for other embodiments.

In the following description, unless indicated otherwise terms such as "accessing" or "determining" or "transforming" or "generating" or the like, refer to the operations and processes of a computer system, or similar electronic computing device that manipulates and transforms data represented as physical (electronic) quantities within the computer system's registers and memories and other computer readable media into other data similarly represented as physical quantities within the computer system memories or registers or other such information storage, transmission or display devices.

As used herein the term "item" is intended to include but not be limited to various types of merchants such as restaurants. As used herein the term "domain" is intended to include but not be limited to various types of jurisdictions or locations such as cites, states, nations, etc. and can include various types of merchants.

Network Infrastructure

Figure 1A:
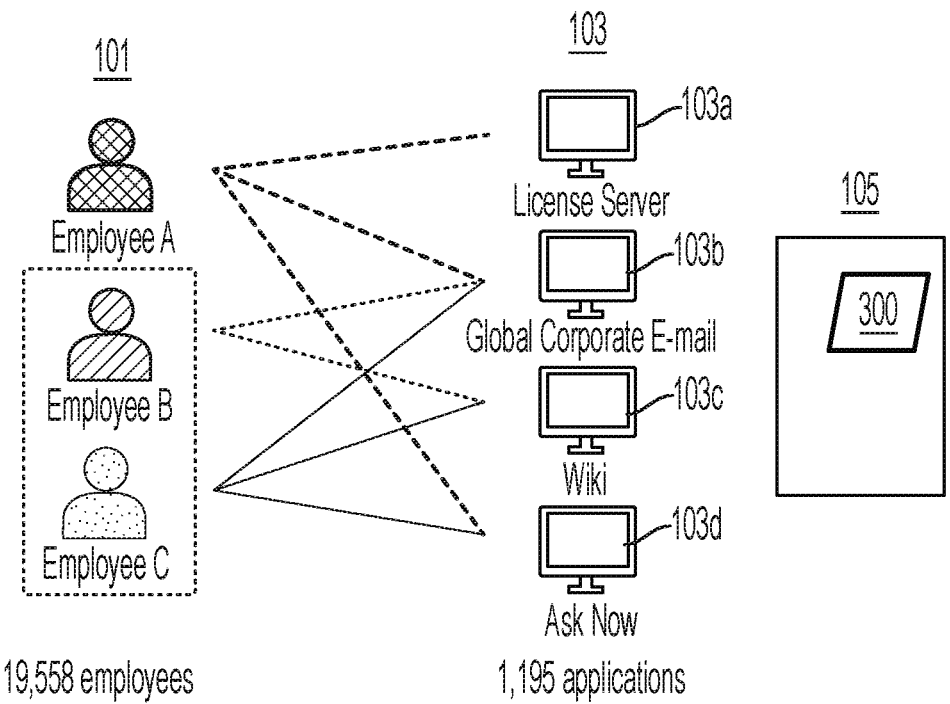
FIG. 1A shows elements of the network infrastructure of an organization according to an embodiment.

FIG. 1A shows elements of a network infrastructure of an organization according to an embodiment. In an embodiment, the infrastructure includes employees 101, applications 103, application server 105 and system 300.

Referring to FIG. 1A, the employees 101 can be employed by an organization that is serviced by the application server 105. In the example of FIG. 1A, the employees 101 include 19,558 individuals. However, this number of employees is only exemplary, and any number of employees, either less or more, can be involved. In an embodiment, the applications 103 are used to service the organization. In an embodiment, the applications 103 can include but are not limited to license server 103a, global corporate e-mail 103b, organization wiki 103c and ask now 103d. In other embodiments, other or different types of applications can be included.

System 300 provides an fully automatic way to identify the peers of an employee from all the employees in an organization based on server and application access data. In an embodiment, human annotation is not required, in either training or testing stages. In an embodiment, by comparing the behavior of an employee with his/her peers, the abnormal behavior of this employee can be identified to prevent the company from data theft, unauthorized data access, and other malicious behaviors that can threaten the organization.

As part of the operation of system 300 server and application access data are collected from each employee's daily interactions with personal workstations and servers. After a predetermined time period, a feature is extracted for each employee based on the collected data in the time period. The features are processed together to increase their representative capabilities. For each employee, the system can use nearest neighbor algorithms to find his/her raw peers in a single time period. Thereafter, the raw peers of the employee are re-ranked based on their absolute rank in multiple time periods. A peer gap score (described herein below) is computed based on the re-ranked employees. The refined peers of the employee are identified based on the peer gap score.

Figure 1B:
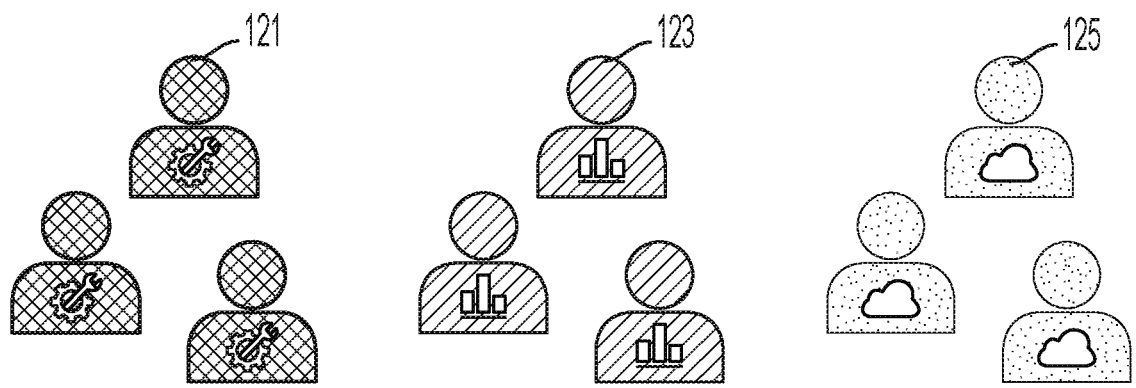
FIG. 1B is an illustration of the grouping of organization employees according to their working behaviors and activities.

FIG. 1B is an illustration of the grouping of organization employees according to their working behaviors and activities. For example, FIG. 1B shows group 121, group 123 and group 125. The emblems associated with each of the groups indicate respective work activities. In an embodiment, the grouping of employees according to their working behaviors and activities enables a better understanding of peer working patterns and the improvement of various tasks such as internal threat detection. FIG. 1C shows a flow of an example process for determining distance between features of employees. Referring to FIG. 1C, a user-application bipartite graph is used to generate profile features. The profile features are used to generate term frequency (TF)— inverse document frequency (IDF) features. The distances between features are then ascertained in order to determine the similarity between different employees of the organization.

Figure 1D:
FIG. 1D is a diagram that shows the applications that have been accessed and not accessed by employees.

FIG. 1D is a diagram that shows the applications that have been accessed and not accessed by each employee. Referring to FIG. 1D, the application(s) that employees have accessed are identified by "1" and the applications that they have not accessed are identified by "0". The ones and zeros in the brackets shown adjacent to each of the employees in FIG. 1D are termed herein as the employee's profile features.

Figure 1E:
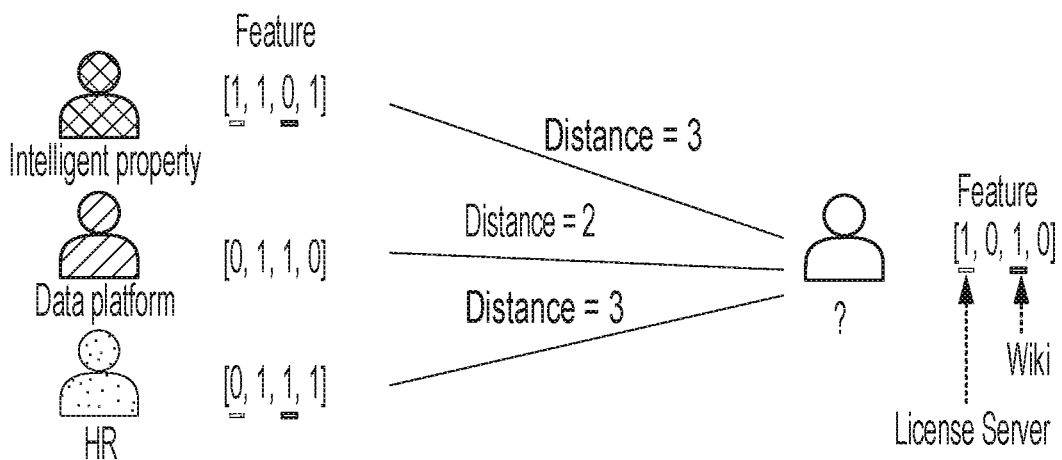
FIG. 1E shows an example manner in which the distance between a designated employee and their peers can be determined according to an embodiment.

FIG. 1E shows an example manner in which the distance between a designated employee and their peers can be determined according to an embodiment. Referring to FIG. 1E, the distance indicated on the diagram corresponds to the number of the differences (based on a place to place comparison of content of the profile features) found to exist between the profile features of a designated employee and the profile features of peers of the designated employee.

Figure 1F:
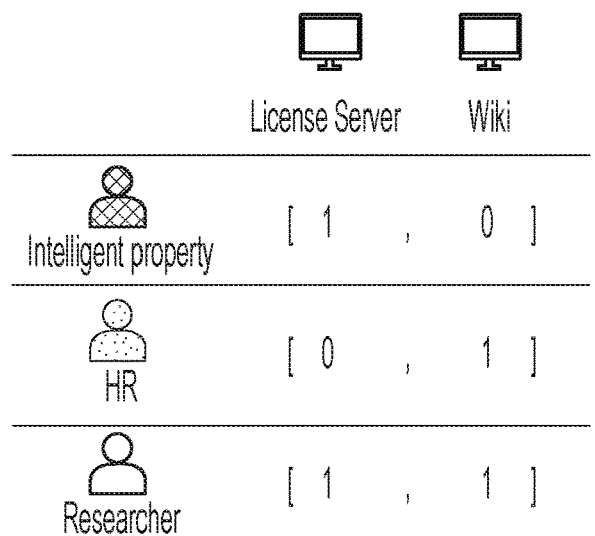
FIG. 1F shows a diagram of the profile features of employees with respect to two applications.
Figure 1G:
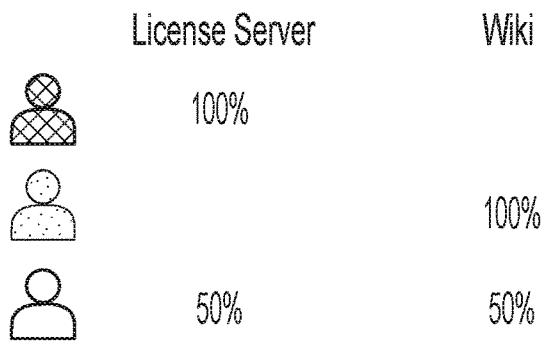
FIG. 1G shows a table that indicates the amount of attention that employees paid to respective applications.
Figure 1H:
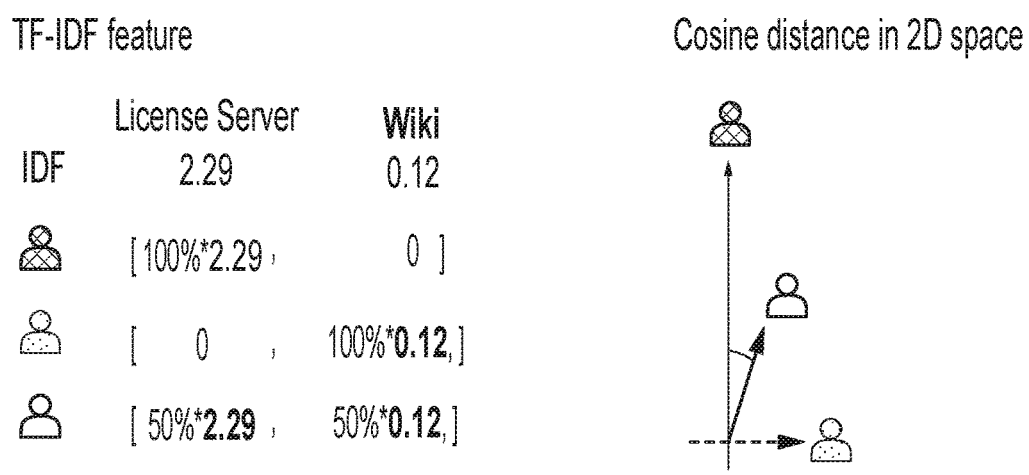
FIG. 1H shows an example manner in which term frequency (TF) and inverse document frequency (IDF) can be used to determine similarity between employees.

FIG. 1F shows a diagram of the profile features of employees with respect to two applications. In this case, to determine the similarity between employees, term frequency (TF) and inverse document frequency (IDF) can be used. As used herein, term frequency is intended to refer to the amount of attention that each employee paid to a specific application. As used herein, inverse document frequency is intended to refer to a measure that indicates which application usage provides the most information about employee identity. FIG. 1G shows the amount of attention each employee paid to the respective applications. Referring to FIG. 1G, employee A spent 100 percent of his/her time accessing the license server, employee B spent 100 percent of his/her time accessing the Wiki, and employee C spent 50 percent of his/her time accessing the license server and 50 percent of his/her time accessing the Wiki. FIG. 1H shows an example manner in which the TF and IDF can be used to determine similarity between employees. For example, referring to FIG. 1H, the table is populated using TF percentages from FIG. 1G and an IDF computed based on the following metrics for a particular time period: a Wiki that is used by 15,000 employees, a license server that is used by 100 employees and a total number of employees of the organization of 19,558. In this example, the $IDF_{wiki}=\log(19558/(1+15000))=0.12$ and the $IDF_{license\ server}=\log(19558/(1+100))=2.29$. Based on these conditions, as shown in FIG. 1H in the graph at right, the cosine distance between employee A, employee B, and employee C, indicates that employee A is more similar to employee C than is employee B.

Operation

Figure 2A:
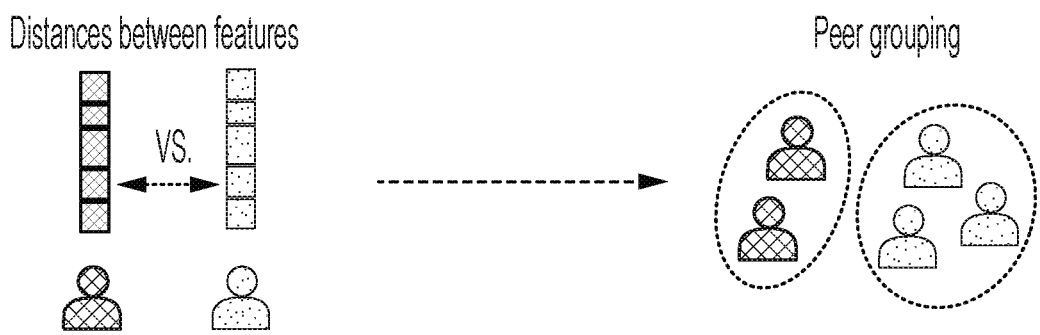
FIG. 2A illustrates an association of employees, based on the distance between the profile features of the employees, that establishes peer groupings.
Figure 2B:
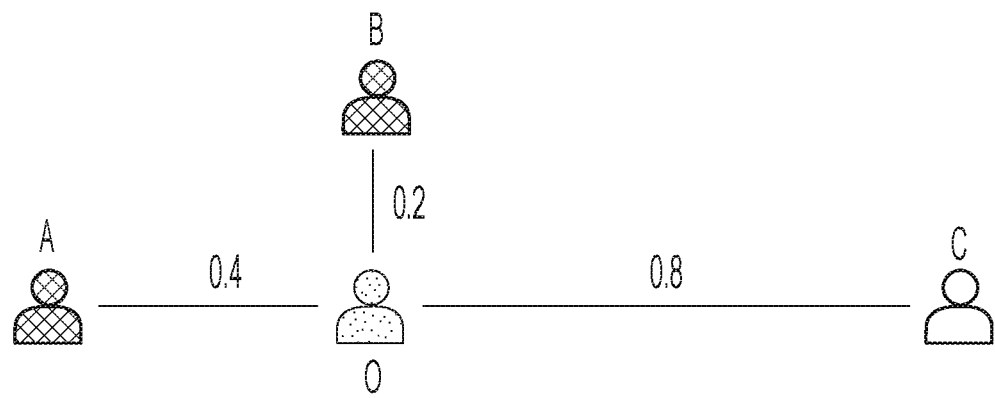
FIGS. 2B-2D show the distances between the features of an employee O, and an employee A, an employee B, and an employee C, in an example peer grouping.
Figure 2C:
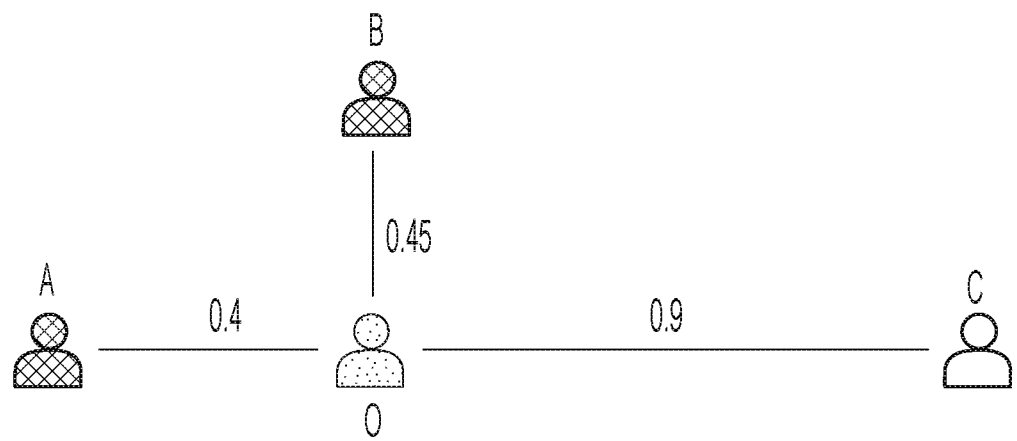
Figure 2D:
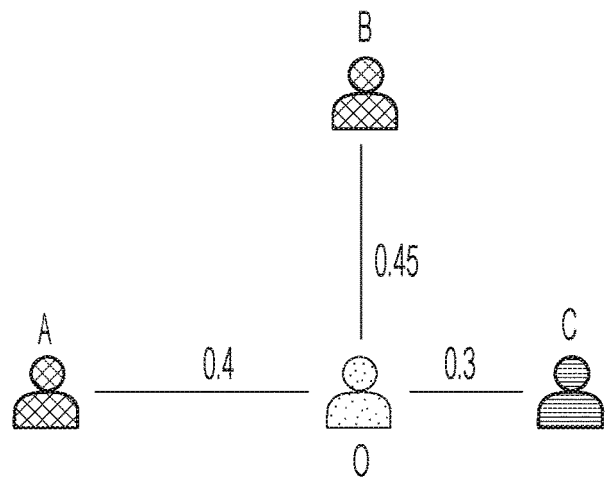
Figure 2E:
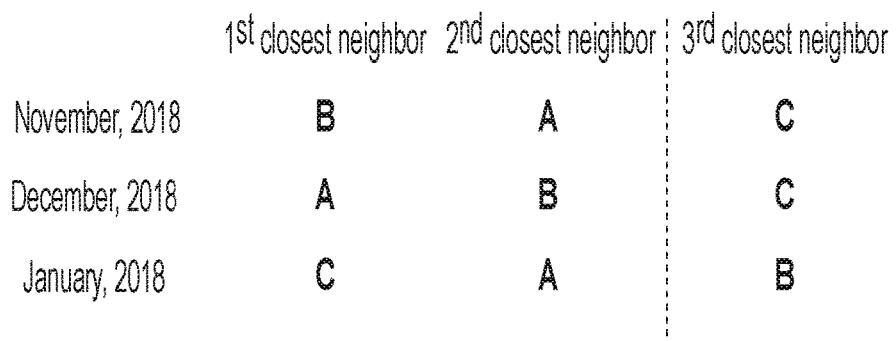
FIG. 2E shows a chart that presents the nearest neighbors of employee O over the three month period shown in FIGS. 2B-2D.
Figure 2F:
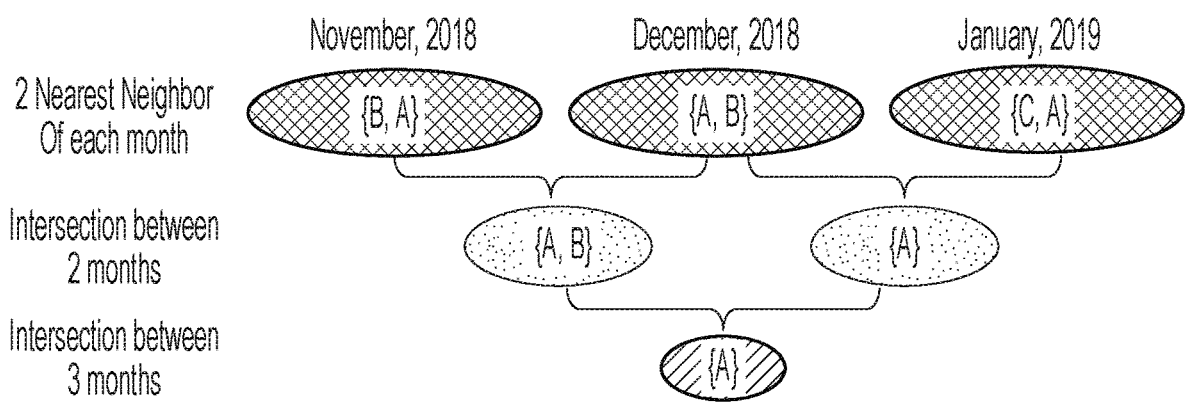
FIG. 2F graphically illustrates the result of FIG. 2E showing nearest neighbor intersections for each month over the three month period.
Figure 2G:
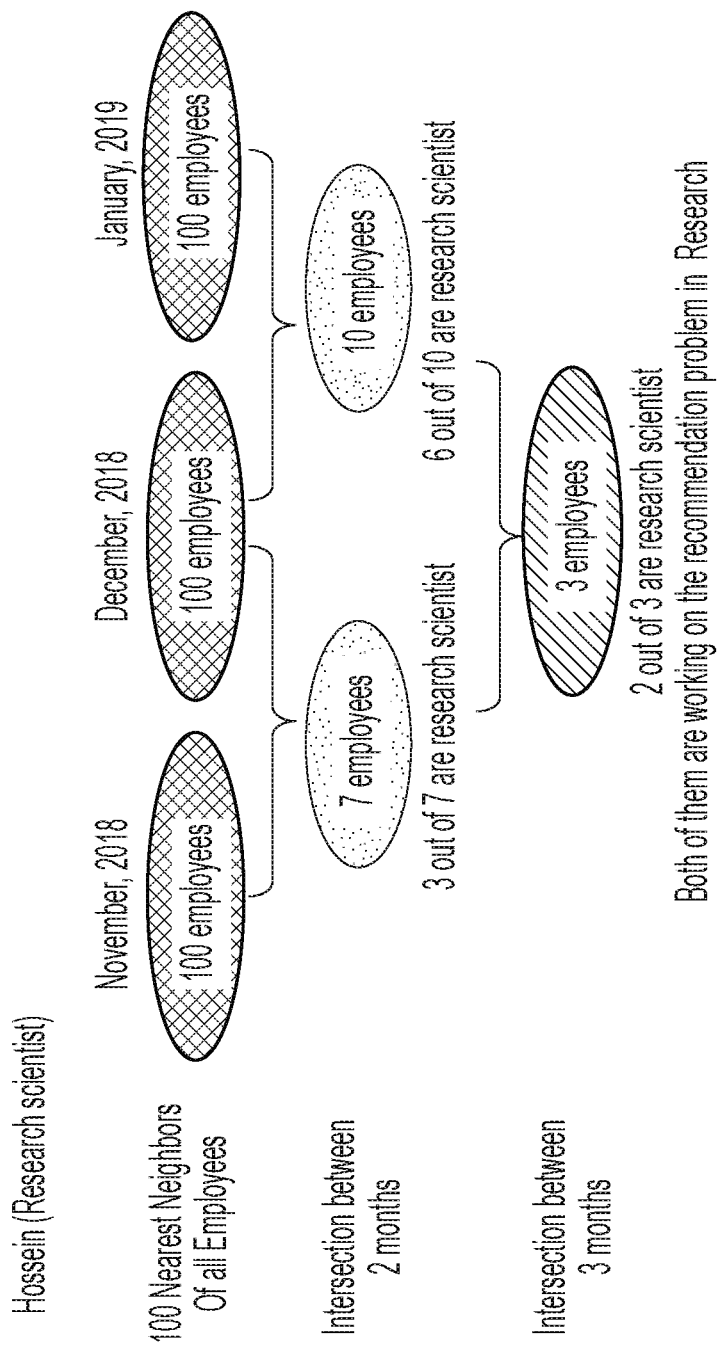
FIG. 2G illustrates a determination of peer consistency for a specific employee H, a research scientist, based on a determination of employee H's 100 nearest neighbors for each of three consecutive months.
Figure 2H:
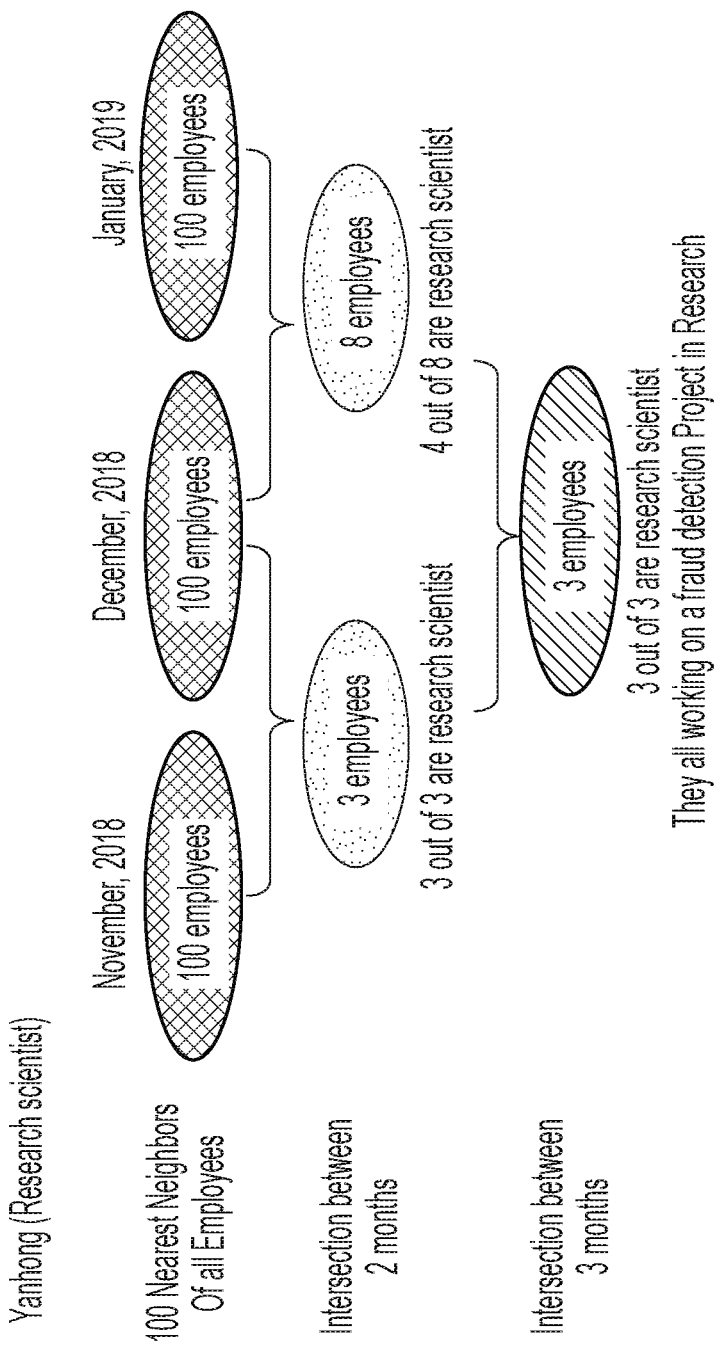
FIG. 2H illustrates a determination of peer consistency for a specific employee Y, a research scientist, based on a determination of employee Y's 100 nearest neighbors for each of three consecutive months.
Figure 2I:
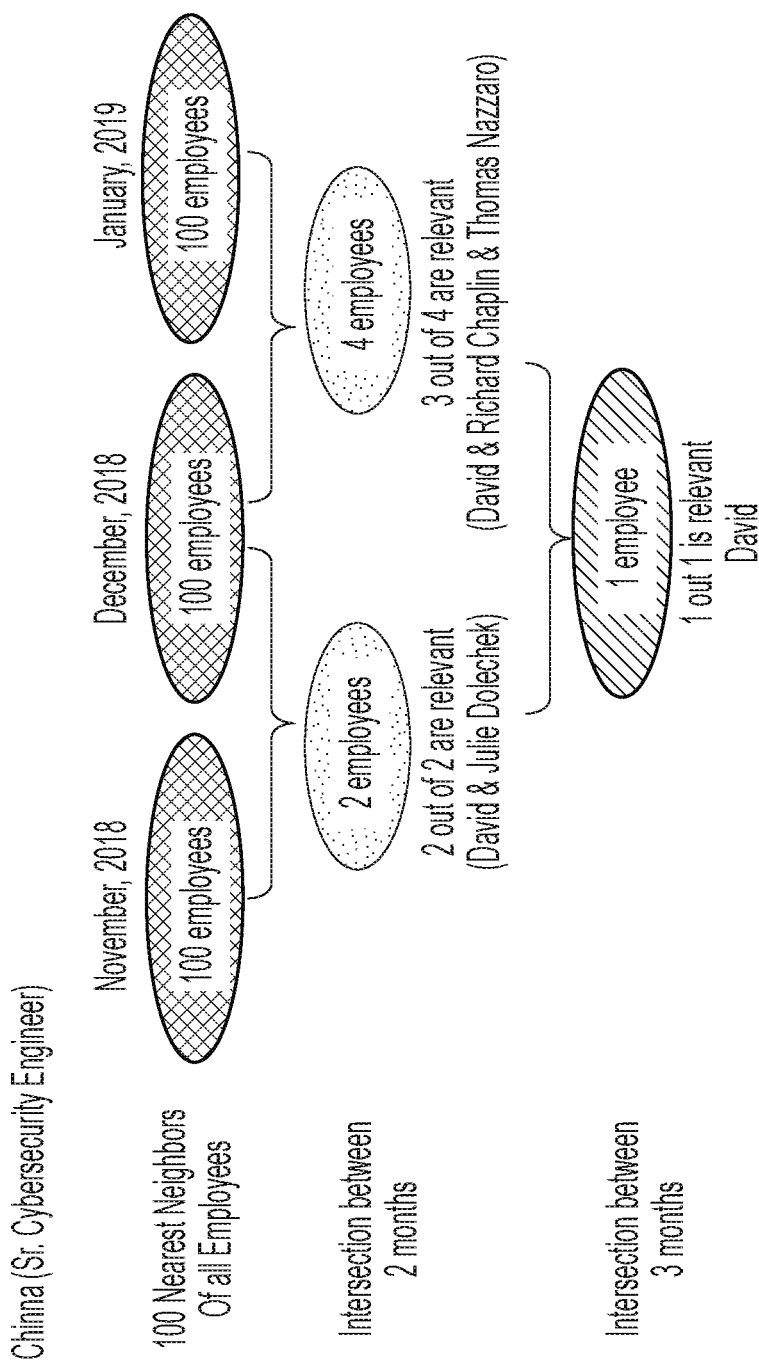
FIG. 2I illustrates a determination of peer consistency for a specific employee C, a senior cybersecurity engineer, based on a determination of employee C's 100 nearest neighbors for each of three consecutive months.
Figure 2J:
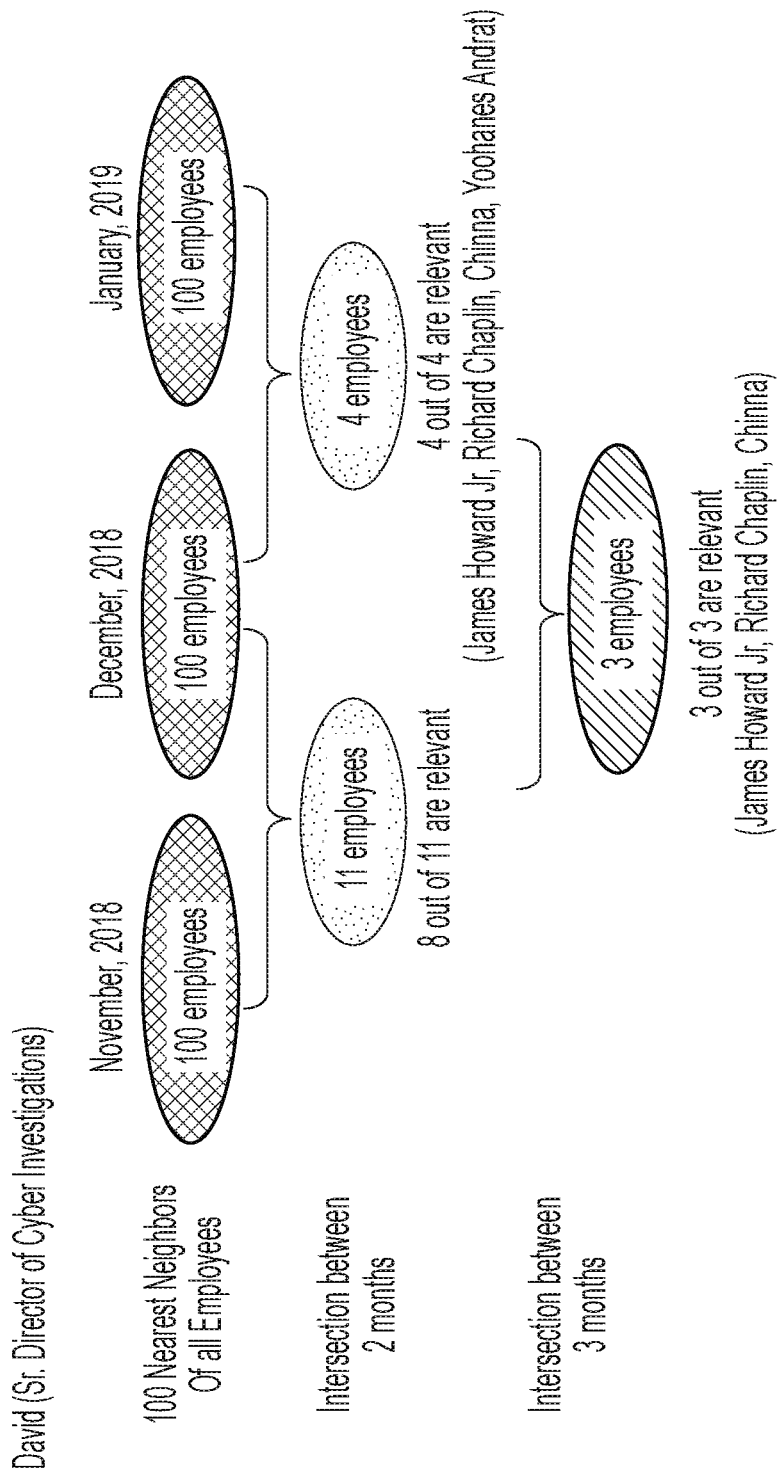
FIG. 2J illustrates a determination of peer consistency for a specific employee D, the senior director of cyber investigations, based on a determination of employee D's 100 nearest neighbors for each of three consecutive months.
Figure 2K:
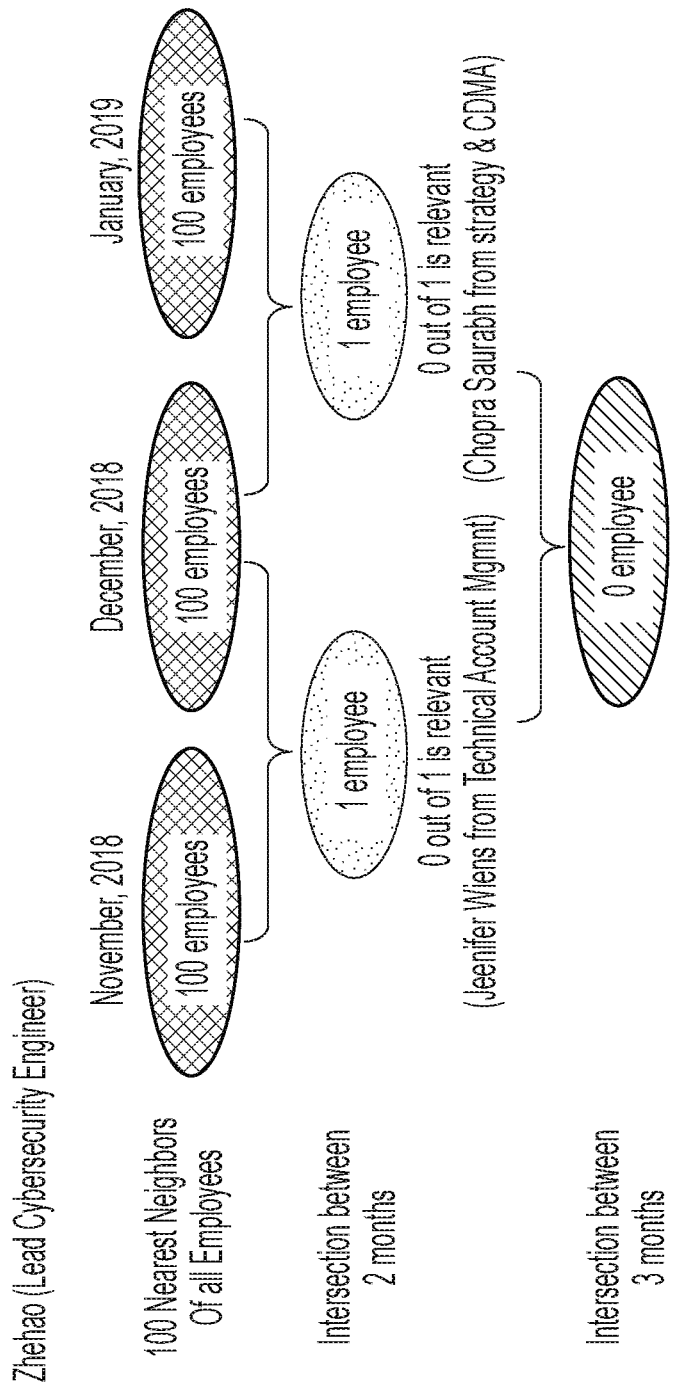
FIG. 2K illustrates a determination of peer consistency for a specific employee Z, the lead cybersecurity engineer, based on a determination of employee Z's 100 nearest neighbors for each of three consecutive months.
Figure 2L:
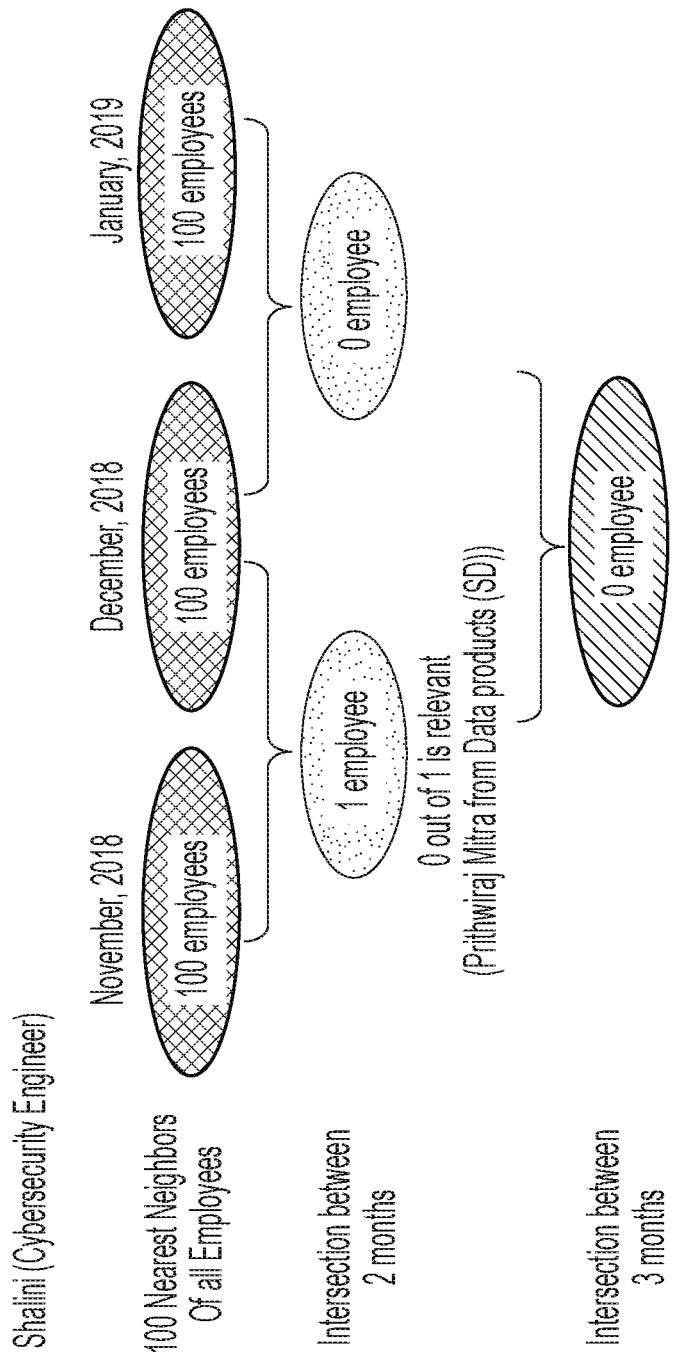
FIG. 2L illustrates a determination of peer consistency for a specific employee S, a cybersecurity engineer, based on a determination of employee S's 100 nearest neighbors for each of three consecutive months.
Figure 2M:
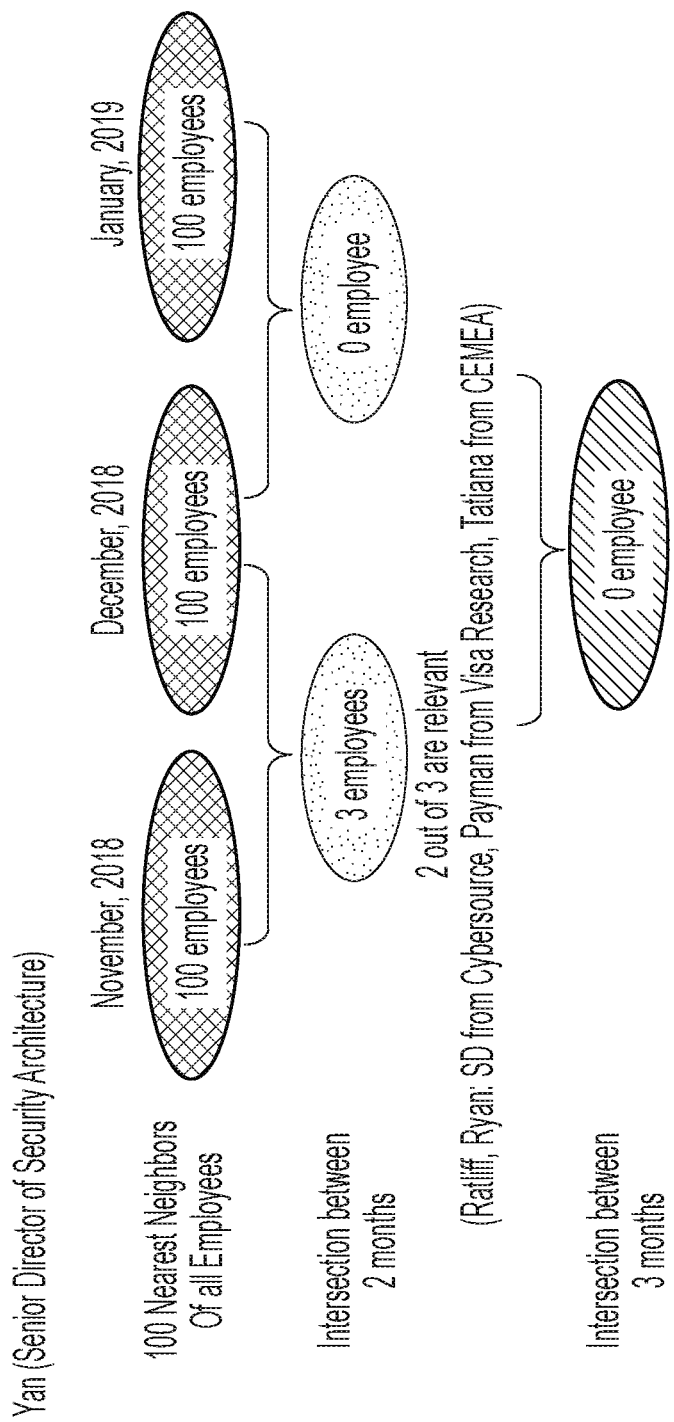
FIG. 2M illustrates a determination of peer consistency for a specific employee ZY, the senior director of security architecture, based on a determination of employee ZY's 100 nearest neighbors for each of three consecutive months.
Figure 2P:
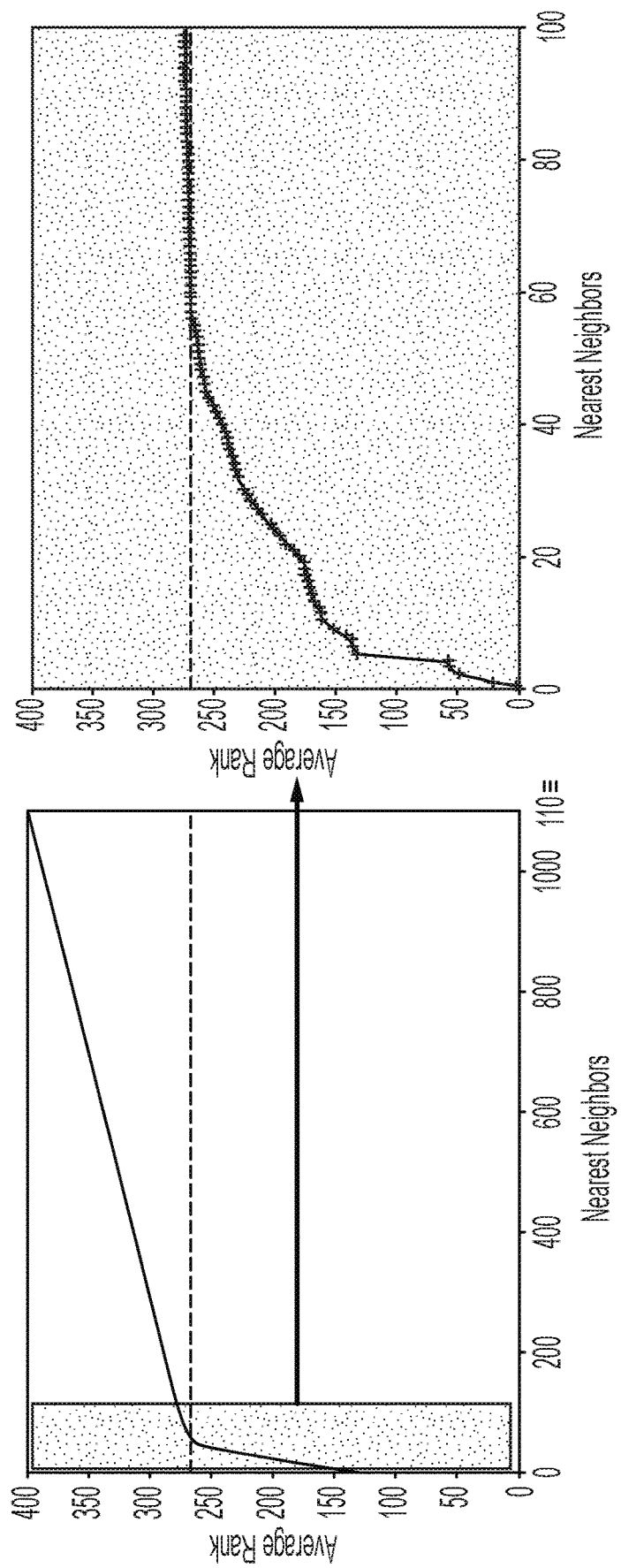
FIG. 2P show graphs of nearest neighbors versus average ARD of sampled employees according to an embodiment.
Figure 2Q:
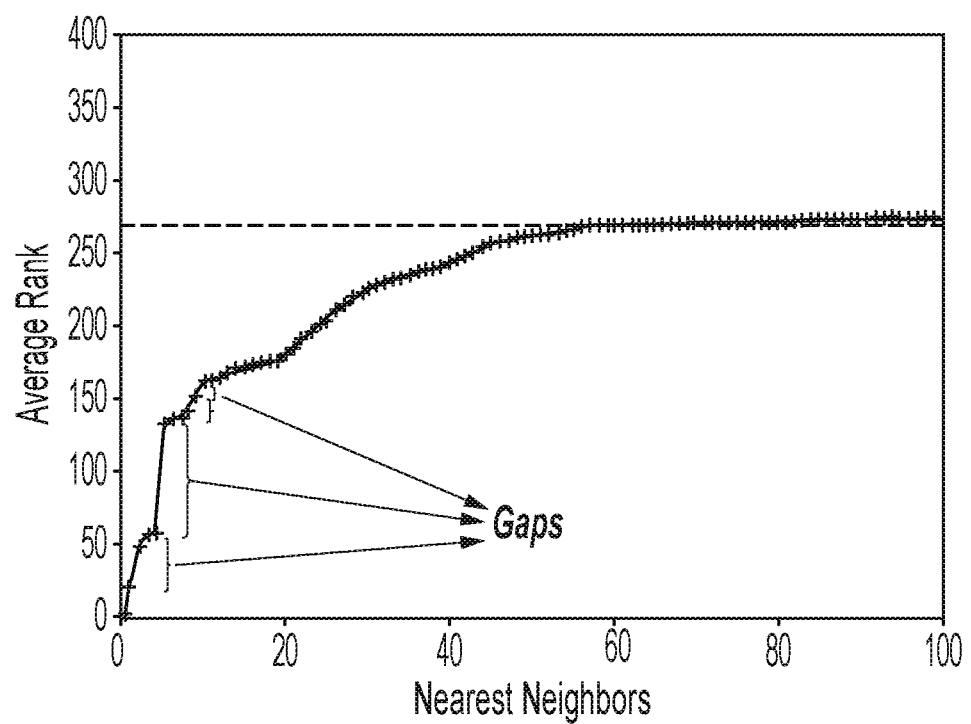
FIG. 2Q shows the graph of FIG. 2P with the gaps between adjacent nearest neighbors identified.
Figure 2R:
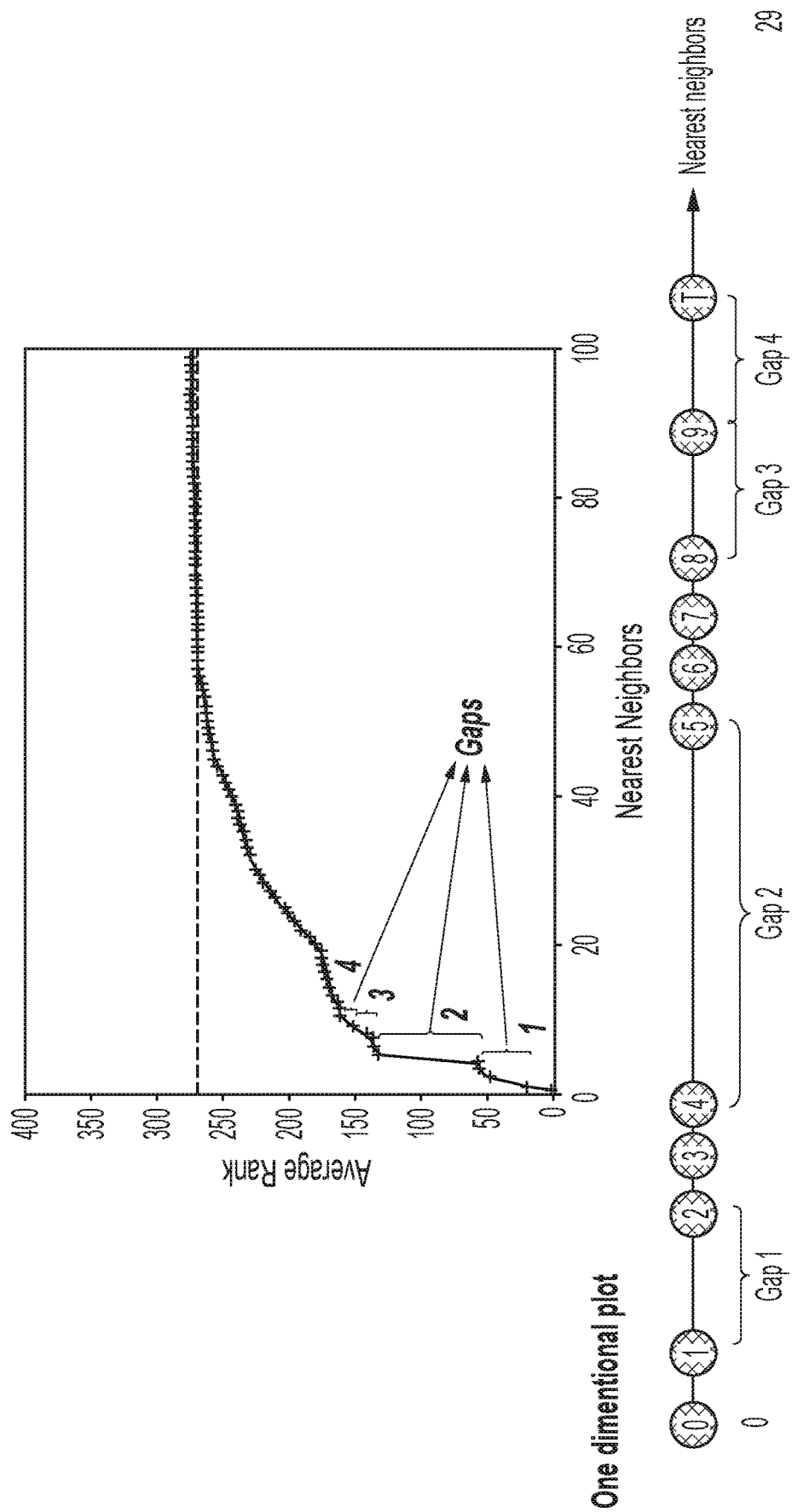
FIG. 2R shows the leftmost graph of FIG. 2P and a one dimensional plot of the gaps shown in the graph.
Figure 2S:
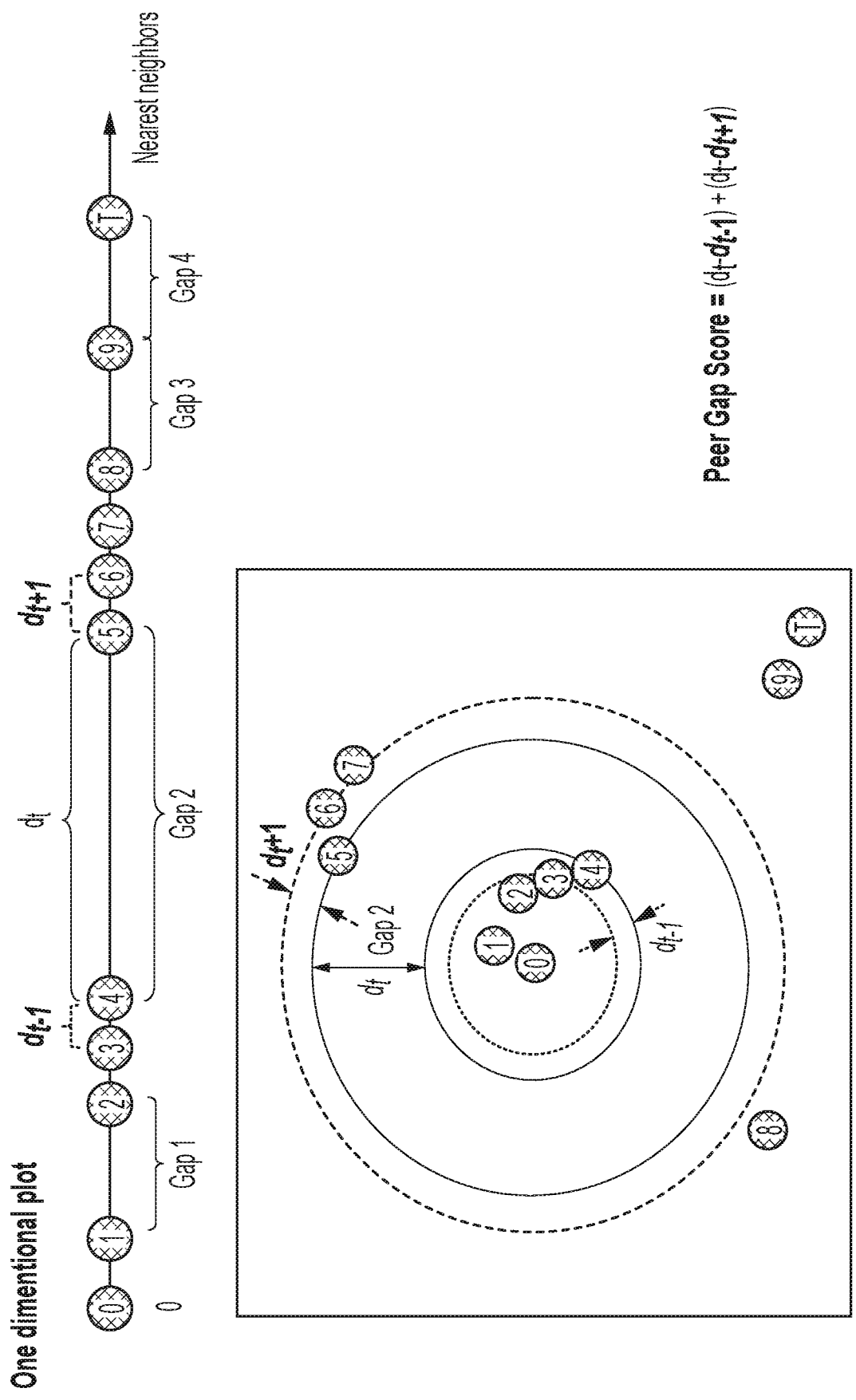
FIG. 2S shows the manner in which peer gap scores corresponding to the average rank gaps between the peers are determined according to an embodiment.
Figure 2T:
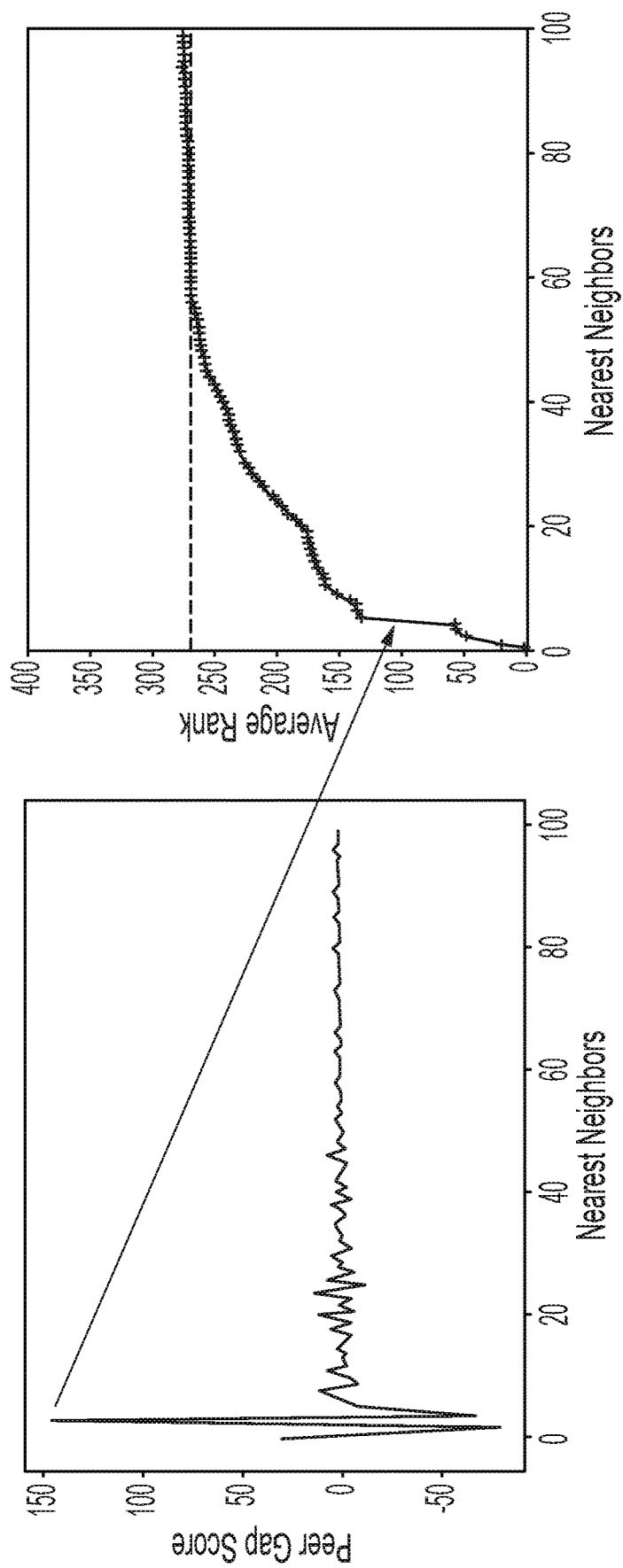
FIG. 2T shows a graph of the nearest neighbors of employee H versus peer group score (left) and a graph of the nearest neighbors of employee H versus average rank distance (right).
Figure 2U:
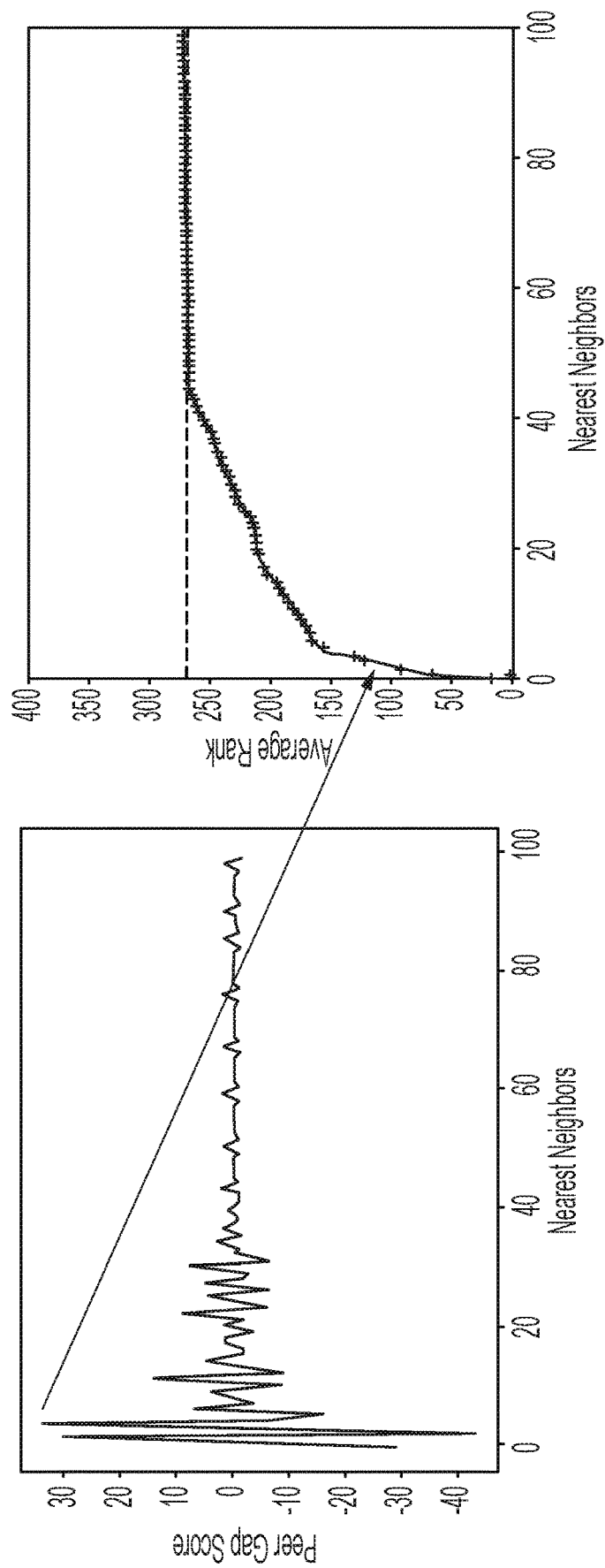
FIG. 2U shows a graph of the nearest neighbors of employee C versus peer group score (left) and a graph of the nearest neighbors of employee C versus average rank distance (right).
Figure 2V:
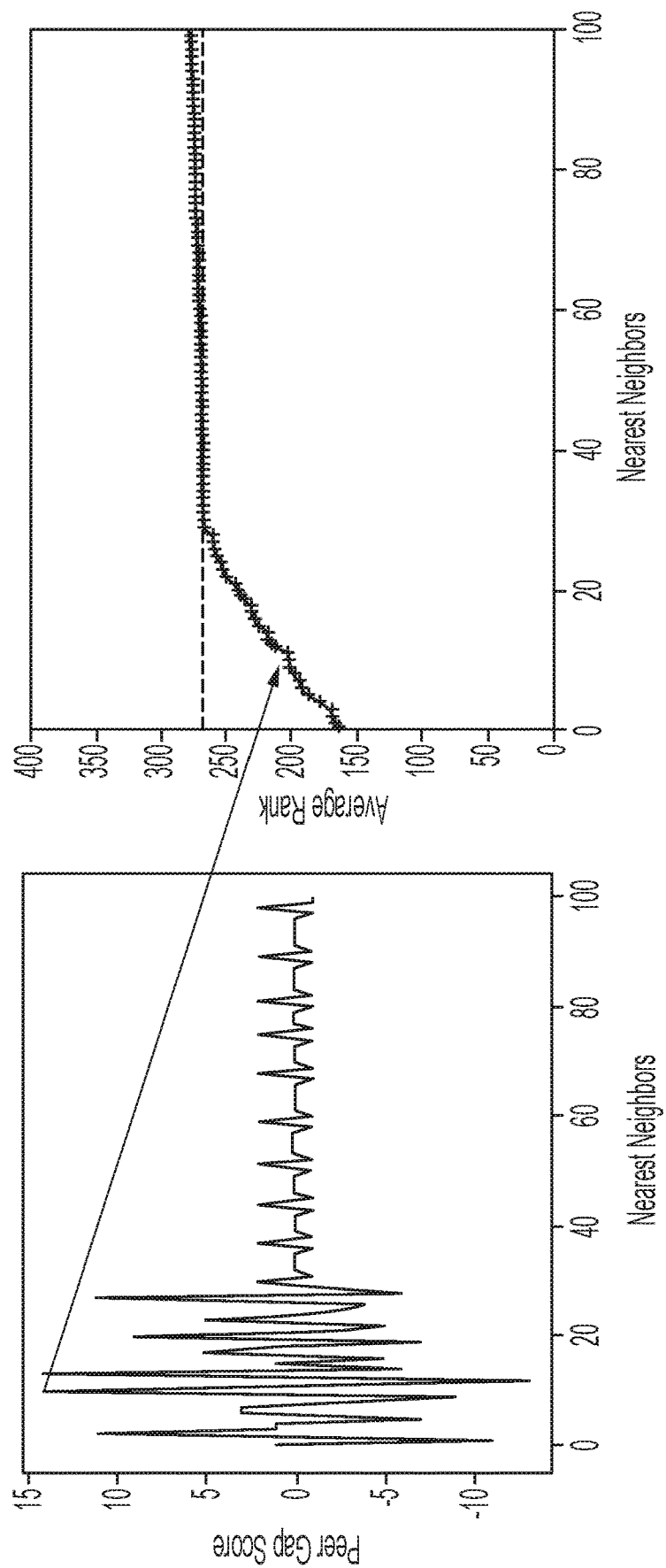
FIG. 2V shows a graph of the nearest neighbors of employee ZY versus peer group score (left) and a graph of the nearest neighbors of employee ZY versus average rank distance (right).
Figure 2W:
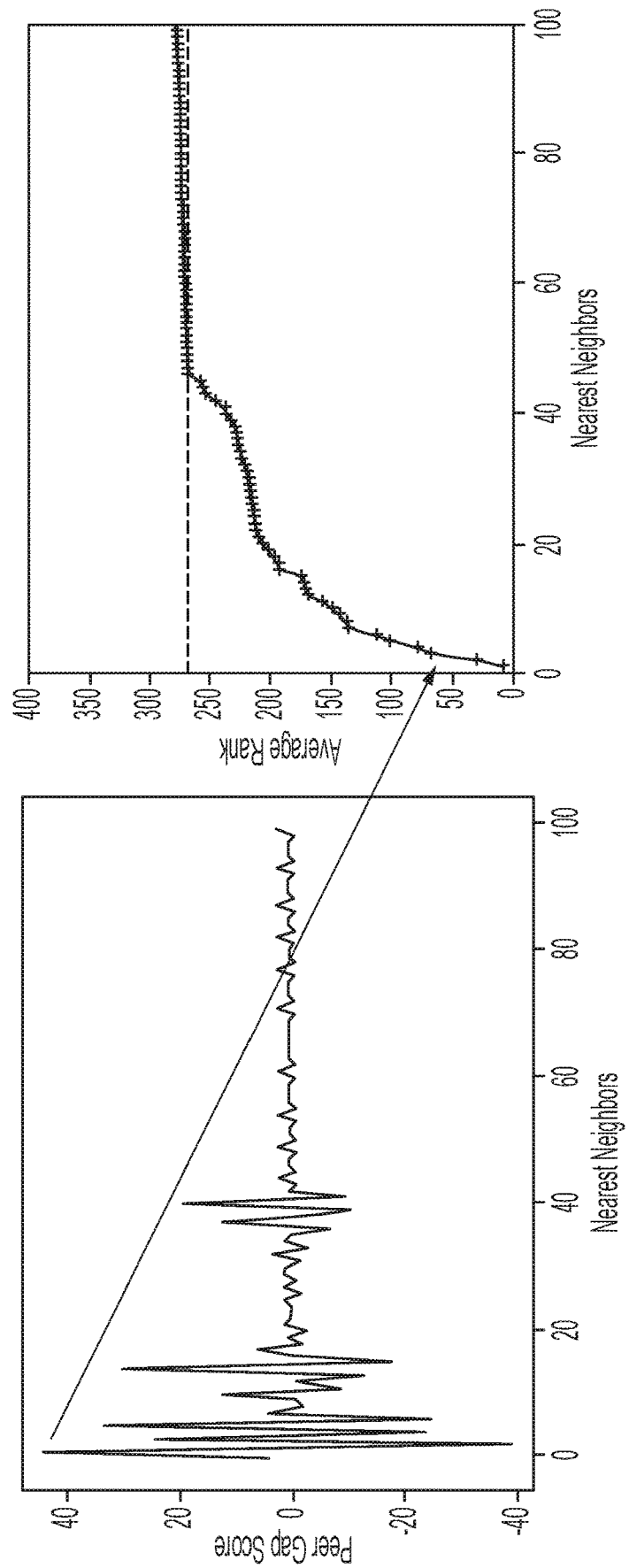
FIG. 2W shows a graph of the nearest neighbors of employee D versus peer group score (left) and a graph of the nearest neighbors of employee D versus average rank distance (right).

FIGS. 2A-2W illustrate operations performed by the system 300 for insider threat detection. In an embodiment, the system 300, as a part of identifying insider threats, determines the distance between employees, determines peer groups based on the determined distance, determines the average rank distance (ARD) of the peers, and identifies gaps in the ARD as a part of identifying anomalous behavior of employees and insider threats.

Determining Distance Between Employees

FIG. 2A shows that the features of individual employees can be compared in order to determine the distance between the features of the individual employees for purposes of peer grouping. As a part of the process, server and application access data is collected from each employee's daily interactions with personal workstations and servers. From these interactions, profile features for each employee are determined for a time period that is being examined. Based on the profile features, the distance between employees can be determined as described herein. It should be appreciated that in other embodiments, profile features can also contain information including job titles, time of stay in the company, and other features that capture the history/behavior of the person in side of company.

Determining Peer Groups

In an embodiment, the behavior of an employee is compared with his/her peers to evaluate the behavior of the employee. As such, as a part of identifying abnormal behavior a determination of peer groups for employees is performed. In an embodiment, profile features of an employee can be compared with the profile features of the peers of an employee in order to determine a peer group of the employee for a particular time period. FIG. 2A illustrates an association of employees based on the distance between their profile features that results in distinct peer groupings. FIGS. 2B-2D show the distances between the features of an employee O, and an employee A, an employee B and an employee C in an example peer grouping. Referring to FIG. 2B, the distance between the profile features of an employee and each of his/her peers can be used to determine the nearest neighbors of the employee. For example, referring to FIG. 2B, for a month e.g., November, peer B having a distance of 0.2 from employee O is determined the nearest neighbor of employee O, peer A having a distance of 0.4 from employee O is determined the second nearest neighbor to employee O, and peer C having a distance of 0.8 from employee O is determined the third nearest neighbor to employee O.

Referring to FIG. 2C, for a second month, e.g., December, peer A having a distance of 0.4 from employee O is determined the nearest neighbor of employee O, peer B having a distance of 0.45 from employee O is determined the second nearest neighbor to employee O, and peer C having a distance of 0.9 from employee O is determined the third nearest neighbor to employee O.

Referring to FIG. 2D, for the month of January, peer C having a distance of 0.3 from employee O is determined the nearest neighbor of employee O, A having a distance of 0.4 from employee O is determined the second nearest neighbor to employee O, and employee B having a distance of 0.45 from employee O is determined the third nearest neighbor to employee O.

In an embodiment, a peer is intended to refer to employees whose monthly work is consistently similar over a predetermined period of time to the work of an employee whose peers are being determined. FIG. 2E shows a chart that presents the nearest neighbors of employee O over the three month period as shown in FIGS. 2B-2D. Referring to FIG. 2E, the table shows that employee A is more likely to be employee O's peer because employee A most consistently ranks among employee O's top 2 nearest neighbors, e.g., employee A is either the first or second closest in November (second closest), December (first closest) and January (second closest).

FIG. 2F graphically illustrates the result of FIG. 2E showing nearest neighbor intersections for each month over the three month period consisting of November, December and January. For example, referring to FIG. 2F, the nearest neighbor intersection between months November and December are neighbors A and B, and the nearest neighbor intersection between the months December and January is neighbor A. These nearest neighbor intersections each represent nearest neighbor intersections between two months (e.g., November/December and December/January) of the three months (e.g., November/December/January) that are examined. In order to determine the nearest neighbor intersection between all three months the nearest neighbor intersection between the nearest neighbor intersection for November/December A and B and the nearest neighbor intersection for December/January A is determined. Thus, as shown in FIG. 2F, the nearest neighbor intersection between all three months November/December/January is A.

FIGS. 2G-2M illustrate the manner of determining peer consistency described with reference to FIG. 2F, in an example that is based on the 100 nearest neighbors of given employees according to an embodiment. For example, FIG. 2G illustrates a determination of peer consistency for a specific employee H, a research scientist, based on a determination of employee H's 100 nearest neighbors for each of three consecutive months, November 2018, December 2018 and January 2019. As part of the determination process, a first nearest neighbor intersection between the 100 nearest neighbors of H in November and the 100 nearest neighbors of H in December (intersection between two months) and a second nearest neighbor intersection between the 100 nearest neighbors of H in December and the 100 nearest neighbors of H in January (intersection between two months) are determined. Thereafter, a third nearest neighbor intersection between the first nearest neighbor intersection and the second nearest neighbor intersection that provides the nearest neighbor intersection for all three months can be determined.

In an embodiment, as shown in FIG. 2G the job titles of the peers of employee H are identified as a part of determining peer consistency. For example, among the employees that are a part of the first nearest neighbor intersection between the 100 nearest neighbors of H in November and the 100 nearest neighbors of H in December three out of seven are research scientists. Moreover, among the employees that are a part of the second nearest neighbor intersection between the 100 nearest neighbors of H in December and the 100 nearest neighbors of H in January six out of ten are research scientists. Furthermore, among the employees that are a part of the third nearest neighbor intersection two out of three are research scientist and both of the research scientists are working on a recommendation problem for the organization. Consequently, the job titles provide confirmation of the peer grouping.

FIG. 2H illustrates a determination of peer consistency for a specific employee Y, a research scientist, based on a determination of employee Y's 100 nearest neighbors for each of three consecutive months. As part of the determination process, a first nearest neighbor intersection between the 100 nearest neighbors of Y in November and the 100 nearest neighbors of Y in December (intersection between two months) and a second nearest neighbor intersection between the 100 nearest neighbors of Y in December and the 100 nearest neighbors of Y in January (intersection between two months) are determined. Thereafter, a third nearest neighbor intersection between the first nearest neighbor intersection and the second nearest neighbor intersection that provides the nearest neighbor intersection for all three months is determined.

In an embodiment, as shown in FIG. 2H as a part of determining peer consistency for employee Y the job title of the peers of employee Y can be identified. For example, among the employees that are a part of the first nearest neighbor intersection between the 100 nearest neighbors of Y in November and the 100 nearest neighbors of Y in December, three out of three are research scientists. Moreover, among the employees that are a part of the second nearest neighbor intersection between the 100 nearest neighbors of Y in December and the 100 nearest neighbors of Y in January, four out of eight are research scientists. Furthermore, among the employees that are a part of the third nearest neighbor intersection, three out of three are research scientists and all of the research scientists are working on a fraud detection problem.

FIG. 2I illustrates a determination of peer consistency for a specific employee C, a senior cybersecurity engineer, based on a determination of employee C's 100 nearest neighbors for each of three consecutive months November 2018, December 2018 and January 2019. In an embodiment, as shown in FIG. 2I the relevance of the peers of employee C (e.g., the relevance of their work to the work of employee C) is identified as a part of determining peer consistency. For example, among the employees that are a part of a first nearest neighbor intersection between the 100 nearest neighbors of C in November and the 100 nearest neighbors of C in December two out of two are relevant. Moreover, among the employees that are a part of a second nearest neighbor intersection between the 100 nearest neighbors of C in December and the 100 nearest neighbors of C in January three out of four are relevant. Furthermore, among the employees that are a part of a third nearest neighbor intersection one out of one are relevant.

FIG. 2J illustrates a determination of peer consistency for a specific employee D, the senior director of cyber investigations, based on a determination of employee D's 100 nearest neighbors for each of three consecutive months November 2018, December 2018 and January 2019. In an embodiment, as shown in FIG. 2J the relevance of the peers of employee D are identified as a part of determining peer consistency. For example, among the employees that are a part of a first nearest neighbor intersection between the 100 nearest neighbors of D in November and the 100 nearest neighbors of D in December, eight out of eleven are relevant. Moreover, among the employees that are a part of a second nearest neighbor intersection between the 100 nearest neighbors of D in December and the 100 nearest neighbors of D in January four out of four are relevant. Furthermore, among the employees that are a part of a third nearest neighbor intersection three out of three are relevant.

FIG. 2K illustrates a determination of peer consistency for a specific employee Z, a lead cybersecurity engineer, based on a determination of employee Z's 100 nearest neighbors for each of three consecutive months November 2018, December 2018 and January 2019. In an embodiment, as shown in FIG. 2K the relevance of the peers of employee Z are identified as a part of determining peer consistency. For example, among the employees that are a part of a first nearest neighbor intersection between the 100 nearest neighbors of Z in November and the 100 nearest neighbors of Z in December, zero out of one are relevant. Moreover, among the employees that are a part of a second nearest neighbor intersection between the 100 nearest neighbors of Z in December and the 100 nearest neighbors of Z in January, zero out of one are relevant. Furthermore, among the employees that are a part of a third nearest neighbor intersection (intersection of the three months) zero are relevant.

FIG. 2L illustrates a determination of peer consistency for a specific employee S, a cybersecurity engineer, based on a determination of employee S's 100 nearest neighbors for each of three consecutive months November 2018, December 2018 and January 2019. In an embodiment, as shown in FIG. 2L the relevance of the peers of employee S are identified as a part of determining peer consistency. For example, among the employees that are a part of a first nearest neighbor intersection between the 100 nearest neighbors of S in November and the 100 nearest neighbors of S in December zero out of one are relevant. Moreover, among the employees that are a part of a second nearest neighbor intersection between the 100 nearest neighbors of S in December and the 100 nearest neighbors of S in January no employees are relevant. Furthermore, among the employees that are a part of a third nearest neighbor intersection (intersection of the three months) no employees are relevant.

FIG. 2M illustrates a determination of peer consistency for a specific employee ZY, the senior director of security architecture, based on a determination of employee ZY's 100 nearest neighbors for each of three consecutive months November 2018, December 2018 and January 2019. In an embodiment, as shown in FIG. 2M, the relevance of the peers of employee ZY are identified as a part of determining peer consistency for employee ZY. For example, among the employees that are a part of a first nearest neighbor intersection between the 100 nearest neighbors of ZY in November and the 100 nearest neighbors of ZY in December, two out of three are relevant. Moreover, among the employees that are a part of a second nearest neighbor intersection between the 100 nearest neighbors of ZY in December and the 100 nearest neighbors of ZY in January, zero are relevant. Furthermore, among the employees that are a part of a third nearest neighbor intersection (intersection of the three months) zero are relevant.

Determining Average Rank Distance of Peers

FIG. 2N illustrates the manner in which an average rank distance (ARD) between employee O and employees A, B and C described with reference to FIG. 2E are determined. Referring to FIG. 2N, the ARD between A and O can be determined using the calculation: $(2+1+2)/3=1.67$, which indicates that employee A was ranked 2, 1, and 2 in the months November 2018, December 2018, and January 2019 respectively with employee A's average ranking being 1.67. The ARD between B and O can be determined using the calculation: (1+2+3)/3=2, which indicates that employee B was ranked 1, 2, and 3 in the months November 2018, December 2018, and January 2019 respectively with employee B's average ranking being 2. The ARD between C and O can be determined using the calculation: (3+3+1)/3=2.33, which indicates that employee C was ranked 3, 3, and 1 in the months November 2018, December 2018, and January 2019 respectively with employee C's average ranking being 2.33. FIG. 2O illustrates an example of a manner in which the ARD can be used to determine the peers of employee H (described above with reference to FIG. 2G) from H's 400 nearest neighbors based on a determined ARD of all sampled employees over three months that include November 2018, December 2018 and January 2019.

FIG. 2P show graphs of nearest neighbors versus average ARD of sampled employees according to an embodiment. In an embodiment, the rightmost graph is an horizontally expanded version of the leftmost graph. The graphs of FIG. 2P enable average rank gaps between the peers to be readily identified. FIG. 2P exposes large ARD gaps between adjacent nearest neighbors. In particular, the stretched horizontal axis of the rightmost graph FIG. 2P reveals gaps between adjacent nearest neighbors. FIG. 2Q shows the rightmost graph of FIG. 2P with the gaps between adjacent nearest neighbors identified. FIG. 2R shows the rightmost graph of FIG. 2P and a one dimensional plot of the gaps shown in the graph. In FIG. 2R the gaps between adjacent nearest neighbors are identified as gaps 1-4. The one dimensional plot shows the relative sizes of the gaps 1-4 shown in the graph of FIG. 2R.

FIG. 2S shows the manner in which peer gap scores corresponding to the average rank gaps between the peers are determined according to an embodiment. FIG. 2S includes a one dimensional plot (top) and a plot of the gaps in two dimensional space (bottom). The gap between neighbors 3 and 4 is represented as $d_{t-1}$. The gap between neighbors 4 and 5 is represented by $d_t$. The gap between neighbors 3 and 4 is represented by $d_{t+1}$. In an embodiment, an equation for computing the peer gap score derived from the aforementioned gap representations is: Peer Gap Score= $(d_t-d_{t-1})+(d_t-d_{t+1})$. In an embodiment, by using the peer gap score one or more employees that have engaged in abnormal behavior which can indicate an internal threat can be identified.

FIG. 2T shows a graph of the nearest neighbors of employee H versus peer gap score (left) and a graph of nearest neighbors of employee H versus average rank distance (right). FIG. 2U shows a graph of the nearest neighbors of employee C versus peer gap score (left) and a graph of nearest neighbors of employee C versus average rank distance (right). FIG. 2V shows a graph of the nearest neighbors of employee ZY versus peer gap score (left) and a graph of nearest neighbors of employee ZY versus average rank distance (right). FIG. 2W shows a graph of the nearest neighbors of employee D versus peer gap score (left) and a graph of nearest neighbors of employee D versus average rank distance (right). The arrows in FIGS. 2U-2W indicate that peak gap scores correspond to the largest ARD gaps which demonstrates the effectiveness of the peak gap score in identifying anomalous behavior.

Components of System for Insider Threat Detection

Figure 3:
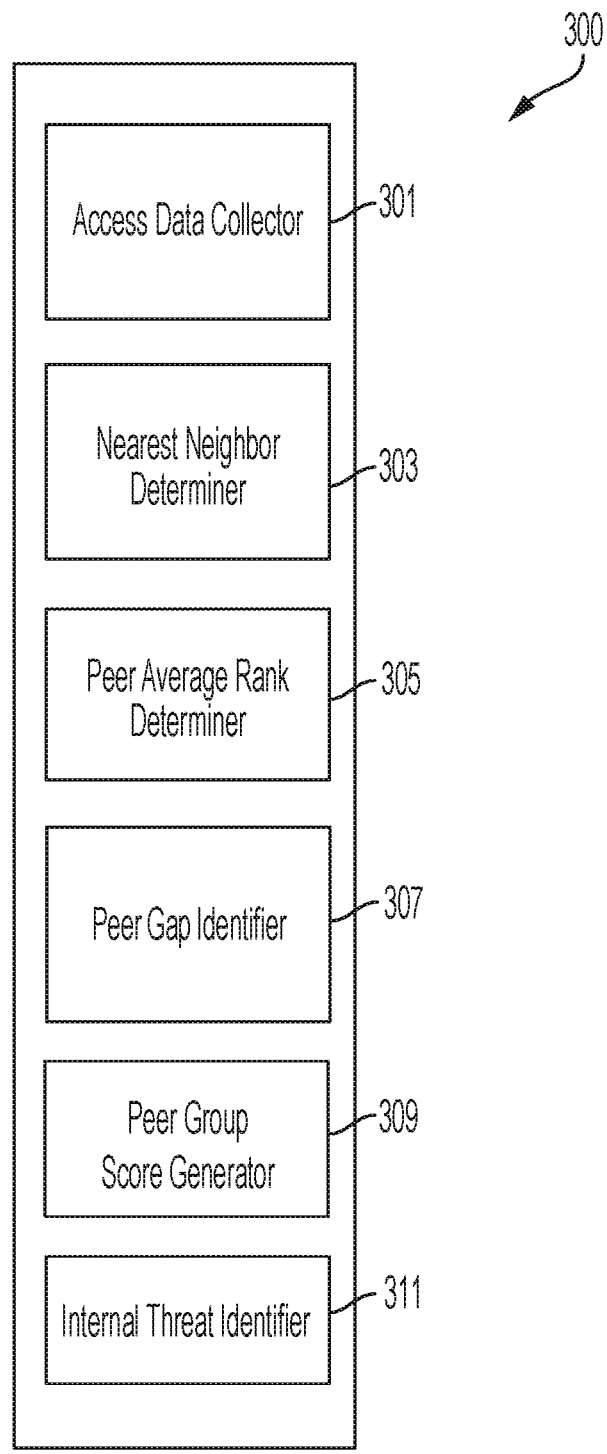
FIG. 3 shows components of a system for insider threat detection according to an embodiment.

FIG. 3 shows components of a system 300 for insider threat detection according to an embodiment. FIG. 3 shows access data collector 301, nearest neighbor determiner 303, peer average rank determiner 305, peer gap identifier 307, peer gap score generator 309, and internal threat identifier 311.

Access data collector 301 collects server and application access data. In an embodiment, server and application access data is collected from each employee's daily interactions with personal workstations and servers. From these interactions, profile features for each employee are determined, for a time period that is being examined. Based on the profile features, the distance between employees can be determined as described herein.

Nearest neighbor determiner 303, based on the server and application access data, determines the nearest neighbors of an employee, to determine a peer group of the employee, for a single time period. In an embodiment, the distance between the profile features of an employee and each of his/her peers can be used to determine the nearest neighbors of the employee.

Peer average rank determiner 305 determines an average rank distance (ARD) of peers in the peer group based on a ranking of the peers in multiple time periods. In an embodiment, the ARD is an average of an employee's nearest neighbor ranking over multiple time periods. For example, in an embodiment, the ARD between a first employee and a second employee, can be determined using the calculation: (2+1+2)/3=1.67, where the first employee is ranked 2, 1, and 2 in first, second and third months, respectively.

Peer gap identifier 307 identifies the average rank gaps between the peers. In an embodiment, the peer gap identifier 307 identifies gaps by locating the average rank gaps that exist between adjacent nearest neighbors.

Peer gap score generator 309 generates a peer gap score that corresponds to gaps between peers. In an embodiment, a gap occurs when a relative distance between peers is larger than the relative distance between peers on first and second sides of the gap. In an embodiment, an equation for computing the peer gap score, Peer Gap Score=$(d_t-d_{t-1})+(d_t-d_{t+1})$, can be derived from a schematic representation of such relative distances as is shown in FIG. 2S. In an embodiment, by using the peer gap score one or more employees that have engaged in anomalous behavior, which can indicate an internal threat, can be identified.

Internal threat identifier 311 identifies one or more employees that may present an internal threat. In an embodiment, such employees can be identified by determining if the employee has engaged in abnormal behavior. In an embodiment, the abnormal behavior can be detected based on the peer gap scores that are generated by the peer gap score generator 309.

FIG. 3 illustrates an example manner of implementing the system 300 of FIG. 1A. In an embodiment, one or more of the elements, processes, components and/or devices of the system 300 may be integrated, separated, re-arranged, omitted, eliminated and/or implemented in other manners. In an embodiment, the components of system 300 can be implemented using hardware, software, firmware and/or any combination thereof. In particular, components of system 300 can be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). In an embodiment, as regards software and/or firmware implementation of the system 300, at least one of the components of such is/are hereby expressly defined to include a non-transitory computer readable storage device or storage disk such as a memory, a digital versatile disk (DVD), a compact disk (CD), a Blu-ray disk, etc. including the software and/or firmware. It should be appreciated that, the example system 300 can include one or more elements, processes and/or devices in addition to, or instead of, those illustrated in FIG. 3, and/or may include more than one of any or all of the illustrated elements, processes and devices.

Figure 4:
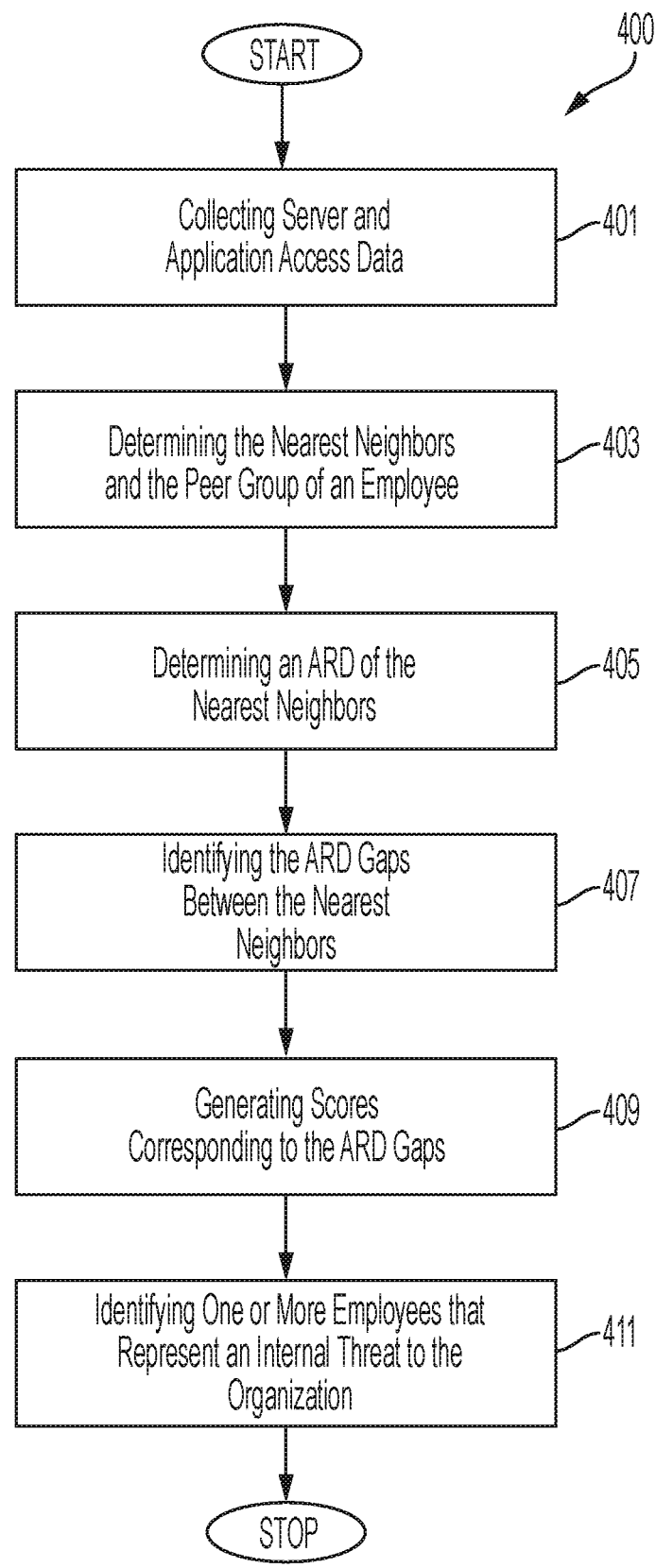
FIG. 4 shows a flowchart of a method for insider threat detection according to an embodiment.

FIG. 4 is a flowchart 400 of a method for internal threat detection according to an embodiment. Referring to FIG. 4, the method includes at 401, collecting server access data and application access data. At 403, based on the server access data and the application access data, determining nearest neighbors of an employee, and based on the nearest neighbors of the employee, determining a peer group of the employee. At 405, determining an average rank distance (ARD) of the nearest neighbors based on a ranking of the nearest neighbors in a plurality of time periods. At 407, identifying ARD gaps between the nearest neighbors. At 409, generating scores corresponding to the ARD gaps between the nearest neighbors. At 411, identifying one or more employees that represent an internal threat to an organization based on the scores corresponding to the ARD gaps.

In an embodiment, an ARD gap has a size that is larger than a distance between nearest neighbors on first and second sides of the ARD gap. In an embodiment, the server access data and the application access data is collected from employee interactions with workstations and servers. In an embodiment, employee interactions with the workstations and the servers generate profile features. In an embodiment, the nearest neighbors are determined based on distances between profile features. In an embodiment, members of the peer group have organizational responsibility similar to that of the employee. In an embodiment, the ARD gaps include gaps between the nearest neighbors.

In an embodiment, the operations of the flowchart 400 can correspond to machine readable instructions of a program that can be executed by a processor of a computer system 500 such as is discussed with regard to FIG. 5 below. In some embodiments, the program and/or portions or parts thereof can be executed by a device other than a processor. The program can be stored on a non-transitory machine or computer readable storage medium such as a hard drive, a digital versatile disk (DVD), a read-only memory, a compact disk, a floppy disk, a Blu-ray disk, a cache, a random-access memory or other storage device. As used herein, the term non-transitory computer readable medium is intended to refer to computer readable storage devices and/or storage disks and to exclude propagating signals and to exclude transmission media. In some embodiments, the program can be embodied in firmware or dedicated hardware. In an embodiment, one or more of the operations of the flowchart can be performed without executing software or firmware. For example, one or more of the blocks may be implemented by one or more hardware circuits such as a Field Programmable Gate Array (FPGA), an Application Specific Integrated circuit (ASIC), a discrete and/or integrated analog and/or digital circuit, a comparator, an operational-amplifier (op-amp), a logic circuit, etc. It should be noted that the order of execution of the blocks of the flowchart of FIG. 4 may be changed. In addition, one or more of the blocks of the flowchart can be eliminated or added.

While one embodiment can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device. Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

Figure 5:
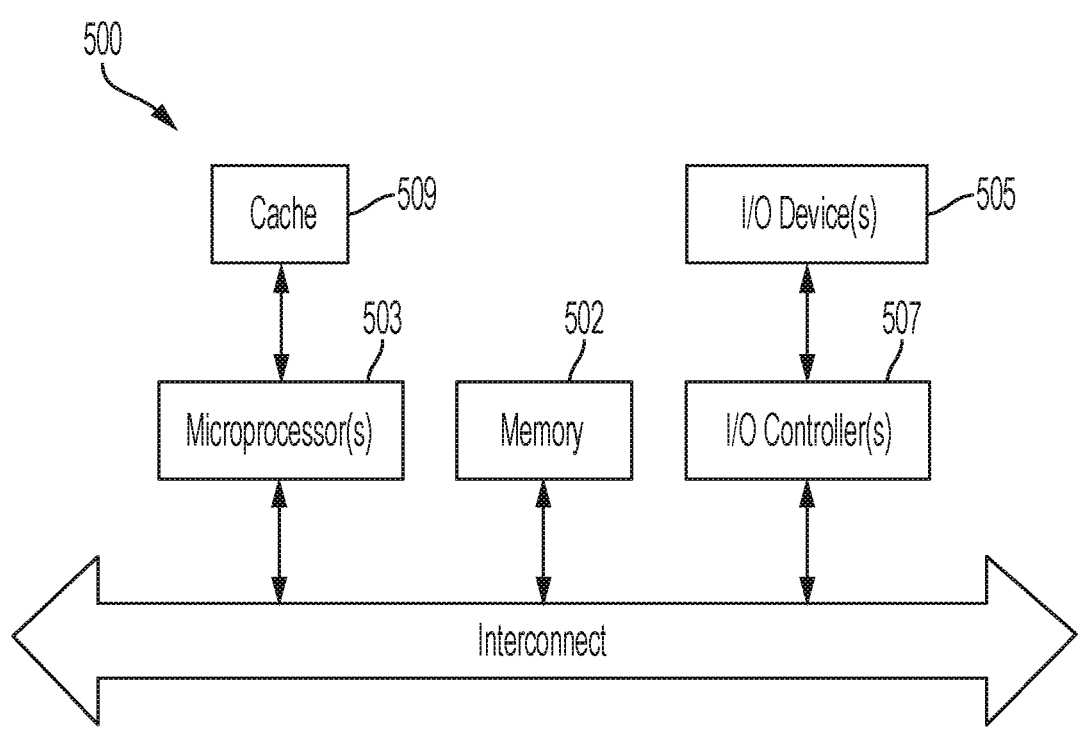
FIG. 5 shows a schematic of a computer system according to an embodiment.

FIG. 5 shows a computer system 500 according to an embodiment. The computer system 500 can include a microprocessor(s) 503 and memory 502. In an embodiment, the microprocessor(s) 503 and memory 502 can be connected by an interconnect 501 (e.g., bus and system core logic). In addition, the microprocessor 503 can be coupled to cache memory 509. In an embodiment, the interconnect 501 can connect the microprocessor(s) 503 and the memory 502 to input/output (I/O) device(s) 505 via I/O controller(s) 507. I/O devices 505 can include a display device and/or peripheral devices, such as mice, keyboards, modems, network interfaces, printers, scanners, video cameras and other devices known in the art. In an embodiment, (e.g., when the data processing system is a server system) some of the I/O devices 505, such as printers, scanners, mice, and/or keyboards, can be optional.

In an embodiment, the interconnect 501 can include one or more buses connected to one another through various bridges, controllers and/or adapters. In one embodiment, the I/O controllers 507 can include a USB (Universal Serial Bus) adapter for controlling USB peripherals, and/or an IEEE-1394 bus adapter for controlling IEEE-1394 peripherals.

In an embodiment, the memory 502 can include one or more of: ROM (Read Only Memory), volatile RAM (Random Access Memory), and non-volatile memory, such as hard drive, flash memory, etc. Volatile RAM is typically implemented as dynamic RAM (DRAM), which requires power continually in order to refresh or maintain the data in the memory. Non-volatile memory is typically a magnetic hard drive, a magnetic optical drive, an optical drive (e.g., a DV D RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In this description, some functions and operations are described as being performed by or caused by software code to simplify description. However, such expressions are also used to specify that the functions result from execution of the code/instructions by a processor, such as a microprocessor.

Alternatively, or in combination, the functions and operations as described here can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of the present disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of an application claiming priority to this provisional application to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A computer-implemented method, comprising:
   collecting server access data and application access data;
   based on the server access data and the application access data, determining nearest neighbors of an employee, and based on the nearest neighbors of the employee, determining a peer group of the employee;
   determining an average rank distance (ARD) of the nearest neighbors based on a ranking of the nearest neighbors in a plurality of time periods;
   identifying ARD gaps between the nearest neighbors;
   generating scores corresponding to the ARD gaps between the nearest neighbors; and
   identifying one or more employees that represent an internal threat to an organization based on the scores corresponding to the ARD gaps.

2. The method of claim 1, wherein an ARD gap has a size that is larger than a distance between the nearest neighbors on first and second sides of the ARD gap.

3. The method of claim 1, wherein the server access data and the application access data is collected from employee interactions with workstations and servers.

4. The method of claim 3, wherein employee interactions with the workstations and the servers generate profile features.

5. The method of claim 4, wherein the nearest neighbors are determined based on distances between profile features.

6. The method of claim 1, wherein members of the peer group have human resource information similar to that of the employee.

7. The method of claim 1, wherein the ARD gaps include gaps between the nearest neighbors.

8. A computer system, comprising:
   one or more hardware processing components;
   one or more hardware data storage components, at least one of the one or more hardware data storage components including instructions that when executed cause at least one of the one or more hardware processing components to:
   collect server access data and application access data;
   based on the server access data and the application access data, determine nearest neighbors of an employee, and based on the nearest neighbors of the employee, determine a peer group of the employee;
   determine an average rank distance (ARD) of the nearest neighbors based on a ranking of the nearest neighbors in a plurality of time periods;
   identify ARD gaps between the nearest neighbors;
   generate scores corresponding to the ARD gaps between the nearest neighbors; and
   identify one or more employees that represent an internal threat to an organization based on the scores corresponding to the ARD gaps.

9. The computer system of claim 8, wherein an ARD gap has a size that is larger than a distance between the nearest neighbors on first and second sides of the ARD gap.

10. The computer system of claim 8, wherein the server access data and the application access data is collected from employee interactions with workstations and servers.

11. The computer system of claim 10, wherein employee interactions with the workstations and the servers generate profile features.

12. The computer system of claim 11, wherein the nearest neighbors are determined based on distances between profile features.

13. The computer system of claim 8, wherein members of the peer group have job titles similar to that of the employee.

14. The computer system of claim 8, wherein the ARD gaps include gaps between the nearest neighbors.

15. A non-transitory computer-readable medium comprising computer readable instructions which when executed, cause a processor to at least:
   collect server access data and application access data;
   based on the server access data and the application access data, determining nearest neighbors of an employee, and based on the nearest neighbors of the employee, determining a peer group of the employee;
   determine an average rank distance (ARD) of the nearest neighbors based on a ranking of the nearest neighbors in a plurality of time periods;
   identify ARD gaps between the nearest neighbors;
   generate scores corresponding to the ARD gaps between the nearest neighbors; and
   identify one or more employees that represent an internal threat to an organization based on the scores corresponding to the ARD gaps.

16. The non-transitory medium of claim 15, wherein an ARD gap has a size that is larger than a distance between the nearest neighbors on first and second sides of the ARD gap.

17. The non-transitory medium of claim 15, wherein the server access data and the application access data is collected from employee interactions with workstations and servers.

18. The non-transitory medium of claim 17, wherein employee interactions with the workstations and the servers generate profile features.

19. The non-transitory medium of claim 18, wherein the nearest neighbors are determined based on distances between profile features.

20. The non-transitory medium of claim 15, wherein members of the peer group have job titles similar to that of the employee.

* * * * *